United States Patent [19]

Yang

[11] Patent Number: 4,619,446
[45] Date of Patent: Oct. 28, 1986

[54] ADJUSTABLE SUPPORT ARM-TYPE THREE-DIMENSIONAL WORK BENCH

[76] Inventor: Tai-Her Yang, 5-1, Tai-Pin St., Si-Hu Town, Dzan-Hwa, Taiwan

[21] Appl. No.: 688,441

[22] Filed: Jan. 2, 1985

[51] Int. Cl.⁴ .............................................. B25B 1/02
[52] U.S. Cl. ..................................... 269/88; 269/152; 269/147; 269/253; 269/900; 269/901
[58] Field of Search ................ 269/900, 901, 88, 139, 269/253, 152–155, 164, 147–149, 203

[56] References Cited

U.S. PATENT DOCUMENTS

| | | | |
|---|---|---|---|
| 1,458,738 | 6/1923 | Teeken | 269/900 |
| 3,061,302 | 10/1962 | Dennis | 269/88 |
| 4,023,787 | 5/1977 | Violette | 269/253 |
| 4,306,709 | 12/1981 | Hurn | 269/139 |
| 4,339,113 | 7/1982 | Vosper | 269/88 |

FOREIGN PATENT DOCUMENTS 2912832  9/1980  Fed. Rep. of Germany ...... 269/253

Primary Examiner—Robert C. Watson
Attorney, Agent, or Firm—Leonard Bloom

[57] ABSTRACT

A versatile workbench has a frame including splayed tripod legs and further including a pair of horizontally-disposed parallel guide rails. A movable jaw is carried on a threaded rod disposed between the guide rails. The movable jaw cooperates with a fixed jaw on the frame for clamping a workpiece therebetween. The jaws have respective faces provided with threaded recesses. A plurality of support rods may be removably received in the threaded recesses. A pair of clamps may be removably secured to a respective support rod, and a screw-threaded means is carried by one of the clamps for moving the clamps towards and away from one another. With this overall arrangement, variously shaped workpieces may be clamped within the workbench.

3 Claims, 100 Drawing Figures

Fig.1-3 →

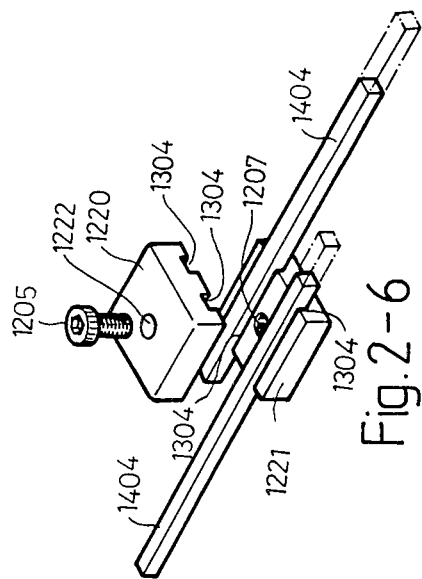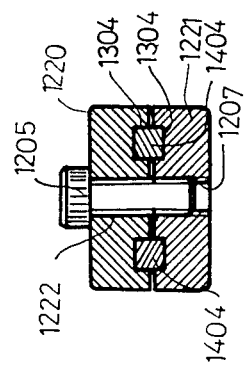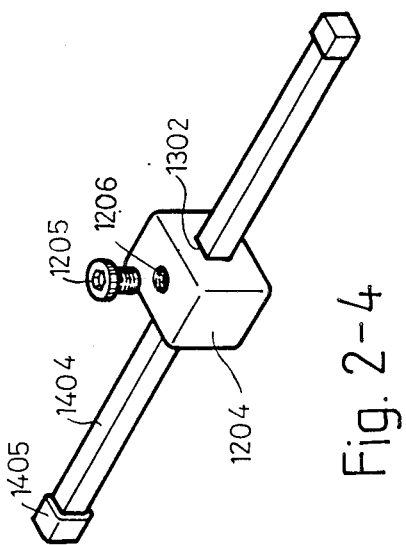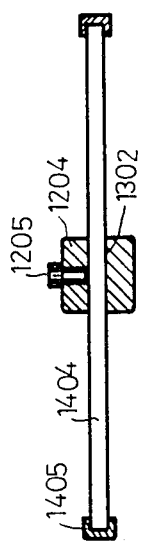

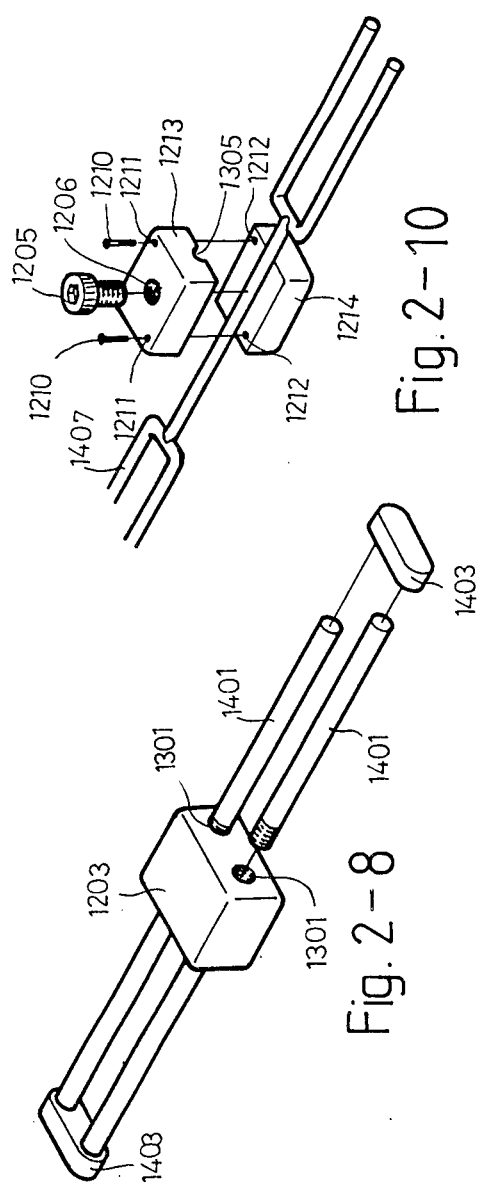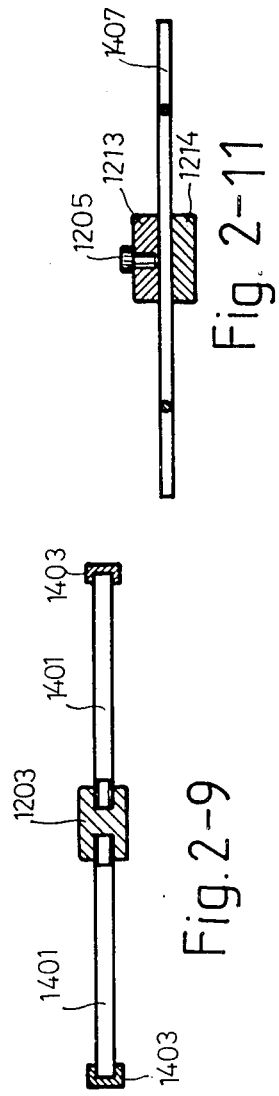

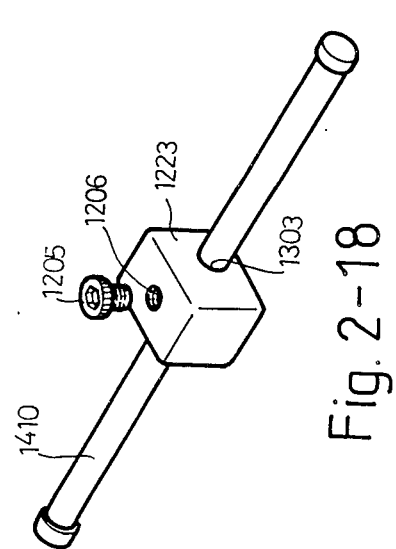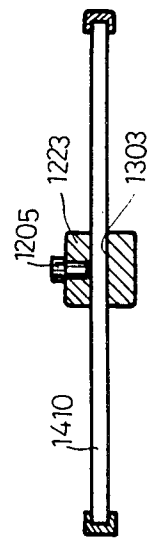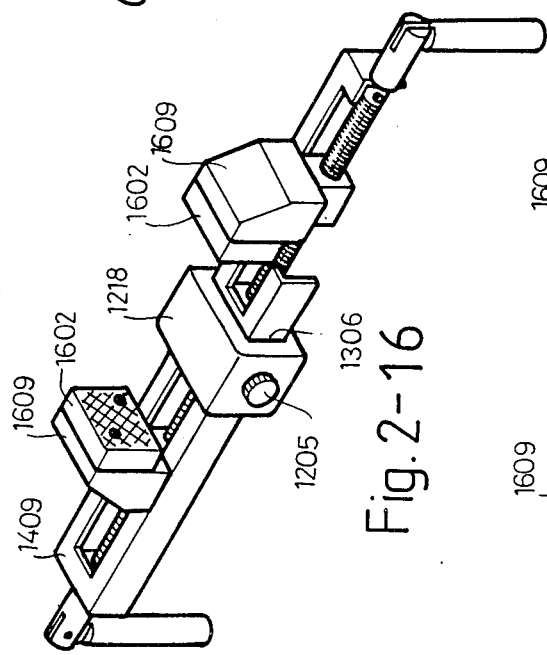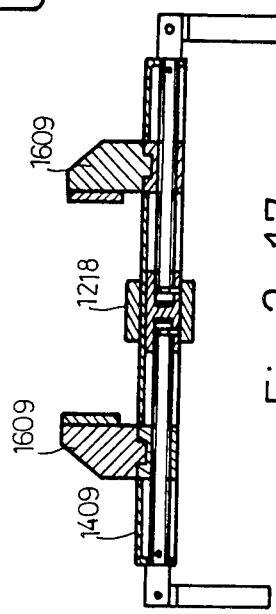

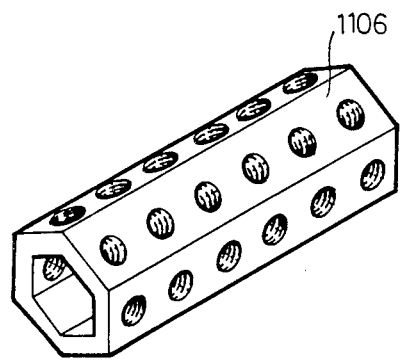 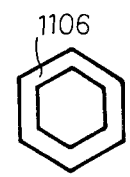
Fig. 3-8  Fig. 3-9
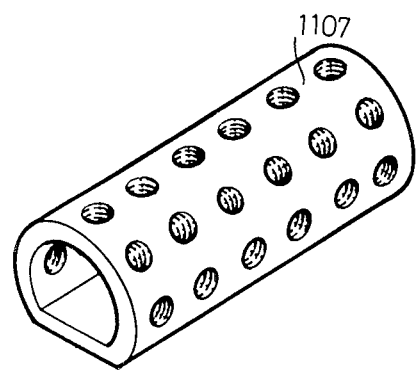 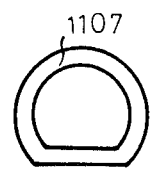
Fig. 3-10  Fig. 3-11

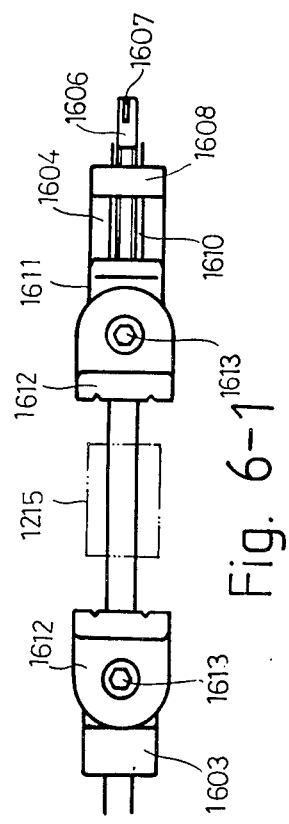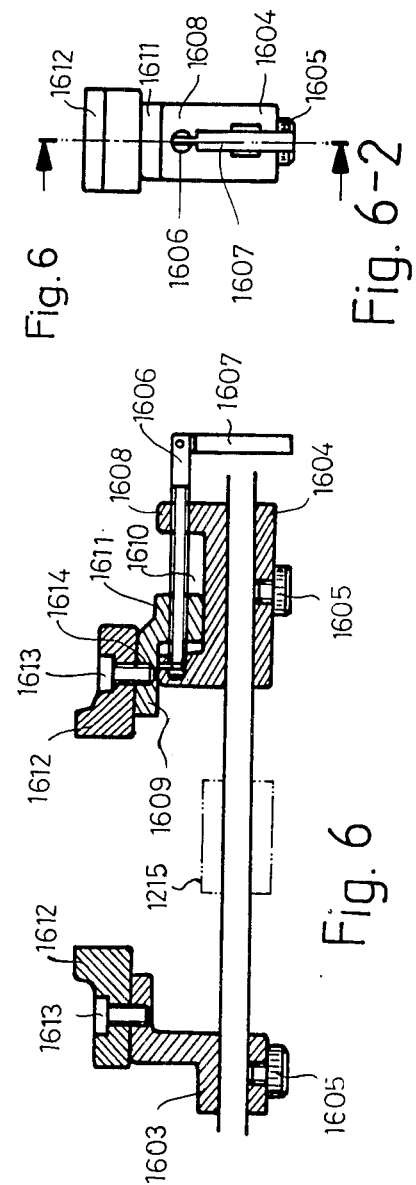

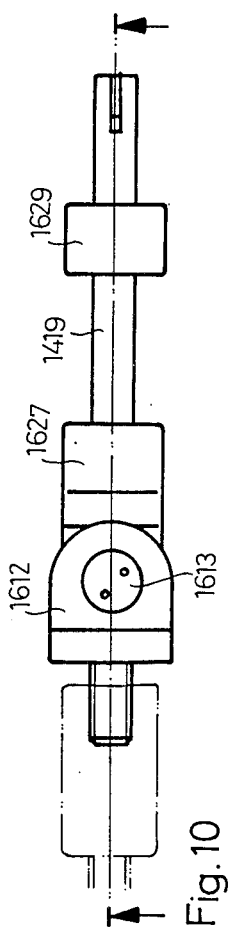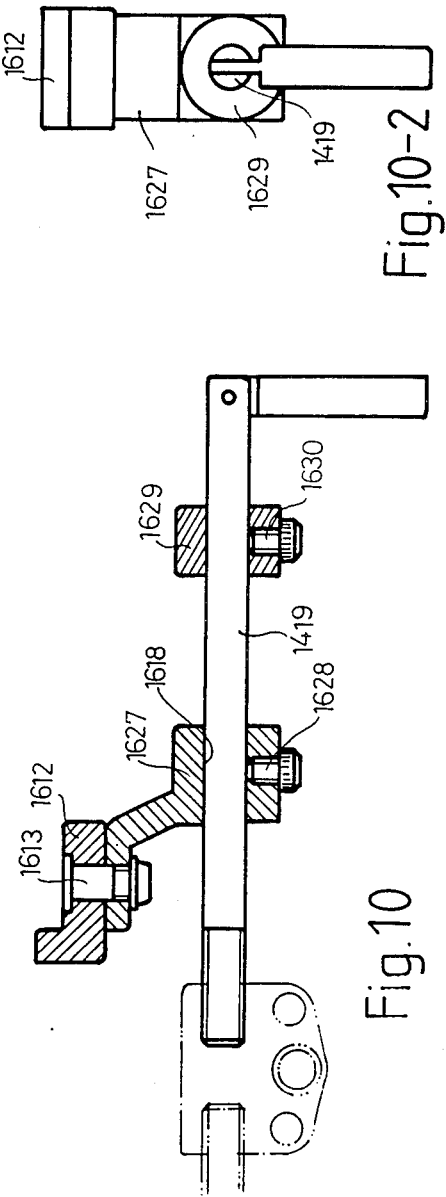

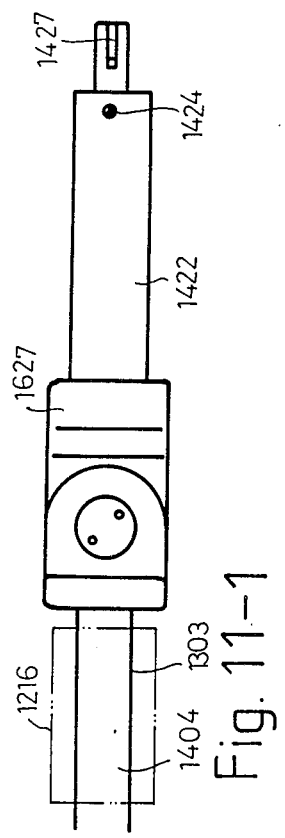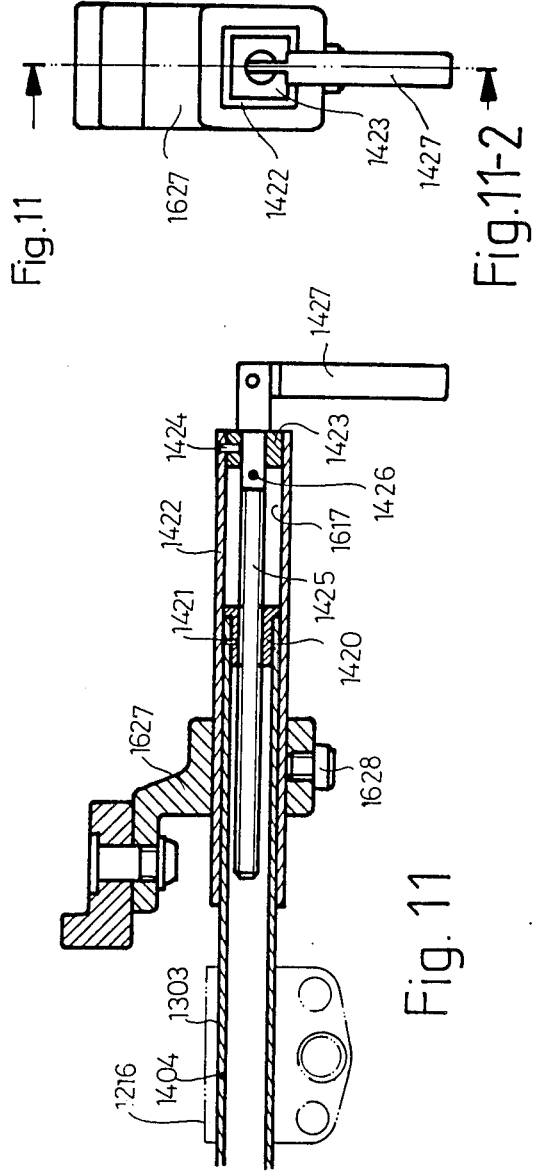

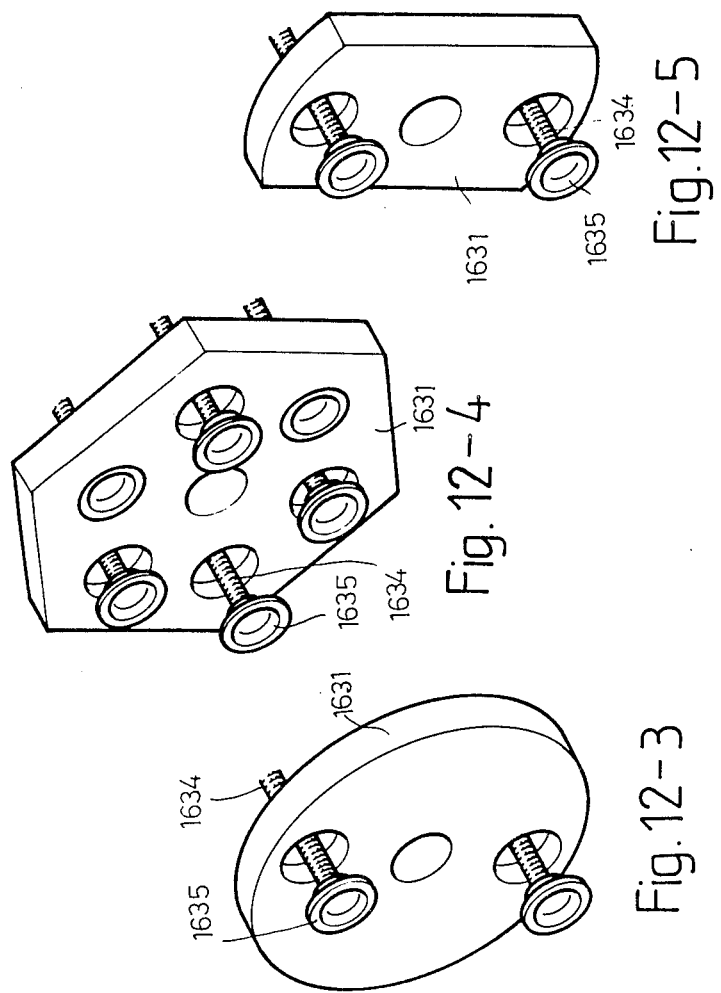

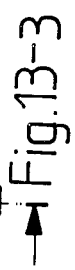
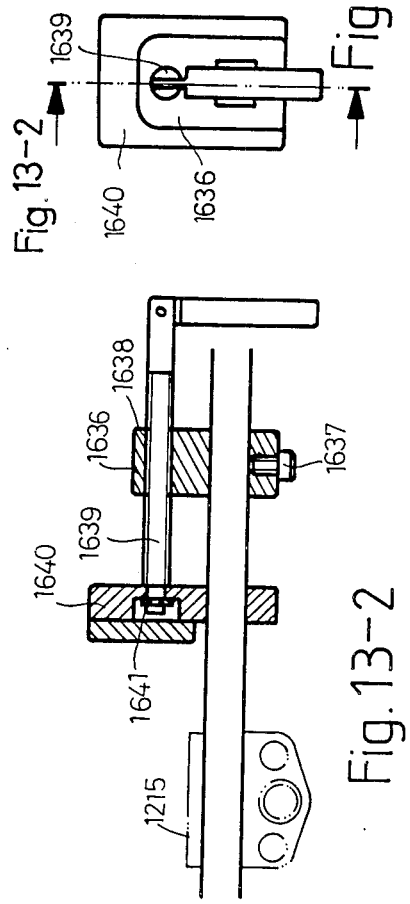
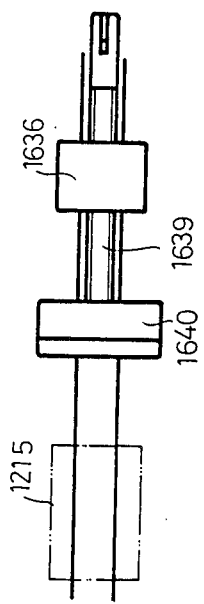

ADJUSTABLE SUPPORT ARM-TYPE THREE-DIMENSIONAL WORK BENCH

SUMMARY OF THE INVENTION

A clamping work bench can firmly clamp the work piece to be processed and thus be great helpful to the safety of the worker, consequently in any clamping work benches have been designed and manufactured during a long time, although such different clamping work benches could satisfy the people's requirements, a kind of the clamping work bench with a wide adaptable scope and the clamping power for the irregular three-dimensional objects is still expected by and deirable for all the people and the present invention is the right design to achieve this purpose.

BACKGROUND OF THE INVENTION

The work benches granted with the U.S. Patents as references to the present invention are briefed as follows:

1. U.S. Pat. No. 2,322,380 with features as below:
   four sets of clamps claws 9 to form the four-directional clamping;
   four sets of drive screws 18 to drive said four sets of clamp claws 9 (as shown in the drawing) conducting the reciprocating toward the center;
   two sets of clamp claws (as shown in the left side of the drawing) jointly provided on the movable jaw 12;
   two sets of clamp claws (as shown in the right side of the drawing) jointly provided on the fixed jaw 10;
   the fuide screw to drive said movable jaw 12 conducting reciprocating movements along the guide rail.

As to the above-said work bench, since its various clamps drive independently, its applicability to clamping the work pieces is very agile, but due to the limitation on its construction, it still exposes the following defects:
   four sets of clamp claws constantly remain in a plane;
   the horizontal plane of the work plane formed by the clamp claws is unadjustable;
   not one of the said four sets of clamp claws is rotatable, so its applicability to the irregular work pieces is comparatively poor.

2. U.S. Pat. No. 4,154,435 with the following features:
   two sets of clamps 8,9;
   two support arms on both sides of clamp 9, the centers of which are hinged on both sides of the middle section of the bench base for the swing center 44;
   Swing arm makes clamp board 9 swing within a vertical to horizontal;
   a drive screw of each of the two sets of said support arms to separately and independently drive said clamp 9 on each of the two sides.

The merits of such a work bench i.e. in that the position of said clamp 9 is adjusted to adapt various work pieces and to provide a vertical support plane as a tool, thus expediting the processing of the work piece on said clamp 8, but due to the limitations of its construction, it still has the following defects:
   imposible to clamp the irregular-shaped work pieces;
   its clamp scope impossible to be expanded to the extent below the horizontal angle;
   impossible to clamp two work pieces to execute the opposite pressurized connection;
   the horizontal angle of the work plane formed by said clamp claws is unadjustable.

In response to the above-said defects, the adjustable support-type three-dimensional work bench under the concept of the present invention has the following main features:

the fixed jaw on movable jaw provided on the triped is a multi-faced body in which screw holes are provided to clamp the support arm to be turned into said hole in a required direction, a separate drive clamp device to clamp the work piece;

further, the clamp machine body fermed by said fixed jaw and movable jaw and guide rails can be adjusted in a horizontal angle and along the foot angle;

the clamp claws of said separate clamp device is rotatable.

Based on its structure, the design of the present invention has the following merits:

the rotatable clamp claws can clamp the irregular-shaped work pieces;

the clamp angle can be optionally selected according to the shapes of the work pieces and be also enlarged to the extent below the horizontal angle;

the number of said support arms can be optionally increased or decreased according to the shapes of the work pieces;

after the clamp structures on the same jaw support arm clamp the work pieces, by the displacement of said movable jaw, the work pieces clamped and held on two opposite clamp structures can be head on connected in two opposite directions;

after locked, the work pieces can still be adjusted in the horizontal angle.

different horizontal planes can exist between and among the clamp claw sets;

one arm can be simitaneously provided with one or more sets of seperate clamp divices;

the end of said arm can be connected with a connection block to increase or change the direction of extension of said support arm in order to clamp the work pieces.

Based on the above-said merits, the present invention shall be a superier design.

BRIEF DESCRIPTION OF THE DRAWINGS

FIG. 1-1 is the top view of the exemplary embodiment of the spiral coupling-type support arm double-jaw clamp work bench.

FIG. 1-2 is the side view of the exemplary embodiment of the spiral coupling-type support arm double jaw clamp work bench.

FIG. 1-3 is the front sectional view of the exemplary embodiment of the spiral coupling-type support arm double jaw clamp work bench.

FIG. 2 is the three-dimensional view of the exemplary embodiment of the horizontal angle-adjustable spiral coupling support arm double-jaw clamp work bench.

FIG. 2-1 is the top view of the exemplary embodiment of the horizontal angle-adjustable spiral coupling support arm double-jaw clamp work bench.

FIG. 2-2 is the side view of the exemplary embodiment of the horizontal angle-adjustable spiral coupling support arm double-jaw clamp work bench.

FIG. 2-3 is the front sectional view of the exemplary embodiment of the horizontal adjustable spiral coupling support arm double-jaw clamp work bench.

FIG. 2-4 is the three-dimensional view of the exemplary embodiment of the through-type adjustable support arm structure.

FIG. 2-5 is the side sectional view of the exemplary embodiment of the through-type adjustable support arm structure.

FIG. 2-6 is the three-dimensional view of the exemplary embodiment of the stagger through-type adjustable support arm structure.

FIG. 2-7 is the front sectional view of the exemplary embodiment of the stagger through-type adjustable support arm structure.

FIG. 2-8 is the three-dimensional view of the exemplary embodiment of the screwing fixing-type parallel mulit-arm structure.

FIG. 2-9 is the side view of the exemplary embodiment of the screwing fixed-type parallel multi-arm structure.

FIG. 2-10 is the three-dimensional view of the exemplary embodiment of the through-type adjustable parallel multi-arm structure.

FIG. 2-11 is the side sectional view of the exemplary embodiment of the through-type adjustable parallel multi-arm structure.

FIG. 2-12 is the three-dimensional view of the exemplary embodiment of the stagger through-type adjustable parallel multi-arm structure.

FIG. 2-13 is the front sectional view of the exemplary embodiment of the stagger through-type adjustable parallel multi-arm structure.

FIG. 2-14 is the three-dimensional view of the exemplary embodiment of slidable adjustment structure with the through-type round hole and parallel support arm.

FIG. 2-15 is the sectional view of the exemplary embodiment of the slidable adjustment structure with the through-type round hole and parallel support arm.

FIG. 2-16 is the view of the through-type support arm structure with the guide rail, guide rod and clamp block.

FIG. 2-17 is the side sectional view of the exemplary embodiment of the through-type support arm structure with the guide rail gude rod clamp block.

FIG. 2-18 is the three-dimensional view of the structure the round slidable adjustment arm a through hole.

FIG. 2-19 is the sectional view of the structure the round slidable adjustment arm with a through hole.

FIG. 2-20 is the three-dimensional view of the exemplary embodiment of the rotatable adjustment support arm structure.

FIG. 2-21 is the top view of the exemplary embodiment of the rotatable adjustment support arm structure.

FIG. 2-22 is the side view of the exemplary embodiment of the rotatable adjustment support arm structure.

FIG. 2-23 is the front sectional view of the exemplary embodiment of the rotatable adjustment support arm structure.

FIG. 3 is the three-dimensional view of the exemplary embodiment of the spiral coupling-type support arm long strip-shaped single-jaw clamp work bench.

FIG. 3-1 is the top view of the exemplary embodiment of the spiral couping-type support arm long strip-shaped single-jaw clamp work bench.

FIG. 3-2 is the side view of the side view of the exemplary embodiment of the spiral coupling-type support arm long strip-shaped single-jaw clamp work bench.

FIG. 3-3 is the front sectional view of the exemplary embodiment of the spiral coupling-type support arm long strip-shaped single-jaw clamp work bench.

FIG. 3-4 is the three-dimensional view of the exemplary embodiment of the triangular long strip-shaped jaw with a support arm spiral hole.

FIG. 3-5 is the sectional view of the exemplary embodiment of the triangular long strip-shaped jaw with a support arm spiral hole.

FIG. 3-6 is the three-dimensional view of the exemplary embodiment of the rectangular long strip-shaped jaw with a support arm spiral hole.

FIG. 3-7 is the sectional view of the exemplary embodiment of the rectangular long strip-shaped jaw with a support arm spiral hole.

FIG. 3-8 is the three-dimensional view of the exemplary hexagonal long strip-shaped jaw with a support arm spiral hole.

FIG. 3-9 is the sectional view of the hexagonal long strip-shaped jaw with a support arm spiral hole.

FIG. 3-10 is the three-dimensional view of the approximate round long strip-shaped jaw with a support arm sprial hole.

FIG. 3-11 is the sectional view of the approximate round long strip-shaped jaw with a support arm spiral hole.

FIG. 4 is the three-dimensional view of the exemplary embodiment of the spiral coupling-type support arm single-jaw clamp work bench.

FIG. 4-1 is the top view of the exemplary embodiment of the spiral coupling-type support arm single jaw clamp work bench.

FIG. 4-2 is the front view of the exemplary embodiment of the spiral coupling-type support arm single jaw clamp work bench.

FIG. 4-3 is the three-dimensional view of the exemplary embodiment of the approximate spherical block shaped jaw with a support arm spiral hole.

FIG. 4-4 is the sectional view of the exemplary embodiment of the approximate spherical block shaped jaw with a support arm spiral hole.

FIG. 4-5 is the three-dimensional view of the exemplary embodiment of the rectangular three-dimensional block shaped jaw with a support arm spiral hole.

FIG. 4-6 is the sectional view of the exemplary embodiment of the rectangular three-dimensional block-shaped jaw with a support arm spiral hole.

FIG. 4-7 is the three-dimensional view of the exemplary embodiment of the hexagonal three-dimensional block-ahaped jaw with a support arm spiral hole.

FIG. 4-8 is the sectional view of the exemplary embodiment of the hexagonal three-dimensional block-shaped jaw with a support arm spiral hole.

FIG. 5 is the three-dimensional view of the exemplary embodiment of the universal adjustable support arm structure.

FIG. 5-1 is the top view of the exemplary embodiment of the universal adjustable support arm structure.

FIG. 5-2 is the sectional view of the exemplary embodiment of the universal adjustable support arm structure.

FIG. 5-3 is the front view of the exemplary embodiment of the universal adjustable support arm structure.

FIG. 6 is the side sectional view of the exemplary embodiment of the structure of the clamp block to be coupled to the round or polygonal single-arm or parallel multi-arm support.

FIG. 6-1 is the top view of the exemplary embodiment of the structure of the clamp block to be coupled to the round or polygonal single-arm or parallel multi support arm.

FIG. 6-2 is the back view of the exemplary embodiment of the structure of the clamp block to be coupled to the round or polygonal single-arm or parallel multi support arm.

FIG. 7 is the side sectional view of the exemplary embodiment of the rotatable disc-shaped clamp claw structure to be coupled to the round support arm.

FIG. 7-1 is the top view of the exemplary embodiment of the rotatable disc-shaped clamp claw structure to be coupled to the round support arm.

FIG. 7-2 is the back view of the exemplary embodiment of the rotatable disc-shaped clamp claw structure to be coupled to the round support arm.

FIG. 8 is the side sectional view of the exemplary embodiment of the structure of rotatabe disc-shaped clamp claw with a positioning seat to be coupled to the retractable round support arm.

FIG. 8-1 is the top view of the exemplary embodiment of of the structure of rotatable disc-shaped clamp claw with a positioning seat to be coupled to the retractable round support arm.

FIG. 8-2 is the back view of the exemplary embodiment of the structure rotatable disc-shaped clamp calw with a positioning seat to be coupled to the retractable round support arm.

FIG. 9 is the side sectional view of the exemplary embodiment of the structure of the disc-shaped clamp claw with a positioning seat to be coupled to the round or multi-faced support arm.

FIG. 9-1 is the top view of the exemplary embodiment of the structure of the disc-shaped clamp claw with a positioning seat to be coupled to the round or multi-faced support arm.

FIG. 9-2 is the back view of the exemplary embodiment of the structure of the disc-shaped clamp claw with a positioning seat to be coupled to the round or multi-faced support arm.

FIG. 10 is the side sectional view of the exemplary embodiment of the structure of the clamp claw with the positioning seat to be coupled to the round or multi-faced support arm.

FIG. 10-1 is the top view of the exemplary embodiment of the structure of the clamp claw with the positioning seat to be coupled to the round or multi-faced support arm.

FIG. 10-2 is the back view of the exemplary embodiment of the structure of the clamp claw with the positioning seat to be coupled to the round or multi-facd support arm.

FIG. 11 is the side sectional view of the examplary embodiemnt of the retractuble tubular-type clamp claw drive structure to be coupled to the square support arm.

FIG. 11-1 is the top view of the exemplary embodiment of the retractuble tubular-type clamp claw drive structure to be coupled to the square support arm.

FIG. 11-2 is the back view of the exemplary embodiment of the retractuble tubular-type clamp calw drive structure to be coupled to the square suport arm.

FIG. 12 is the side sectional view of the exemplary embodiment of the structure of the disc-shaped clamp claw with pluara sets of separate drive clamp blocks to be coupled to the round support arm.

FIG. 12-1 is the top view of the exemplary embodiment of the structure of the disc-shaped clamp claw with pluara sets of separte drive clamp blocks to be coupled to the round support arm.

FIG. 12-2 is the back view of the exemplary embodiment of the structure of the disc-shaped clamp claw with pluara sets of separate drive clamp blocks to be coupled to the round support arm.

FIG. 12-3 is the exemplary embodiment of the disc-shaped clamp claw with two sets of separate drive support arms.

FIG. 12-4 is the exemplary embodiment of the disc-shaped clamp claw with six sets of separate drive support arms.

FIG. 12-5 is the exemplary embodiment of the rectangular clamp claw with two sets of separate drive support arms.

FIG. 13 is the three-dimensional view of the exemplary embodiment of the clamp claw with a stabilization hole to be coupled to the clamp claw.

FIG. 13-1 is the top view of the exemplary embodiment of the clamp claw with a stabilization hole to be coupled to the clamp claw.

FIG. 13-2 is the side section view of the exemplary embodiment of the clamp claw with a stabilization hole to be coupled to the clamp claw.

FIG. 13-3 is the front view of the exemplary embodiment of the clamp claw with a stabilization hole to be coupled to the clamp claw.

FIG. 14 is the three-dimensional view of the exemplary embodiment of the structure of the clamp claw with rotatable clamp claw shown in FIG. 13.

FIG. 14-1 is the top view of the exemplary embodiment of the structure of the clamp claw with rotatable clamp claw shown in FIG. 13.

FIG. 14-2 is the side sectional view of the exemplary embodiment of the structure of the clamp claw with rotatable clamp claw shown in FIG. 13.

FIG. 15 is the view of the parallel joint.

FIG. 16 is the view of the auxiliary support arm.

FIG. 17 is the view of the elbow joint.

FIG. 18 is the view of the three-way joint.

FIG. 19 is the view of the three-way joint.

FIG. 20 is the view of the structure of the base seat with parallel coupling holes.

FIG. 20-1 is the top view of the structure of the base seat with parallel coupling holes.

FIG. 20-2 is the sectional view of the structure of the base seat with parallel coupling holes.

FIGS. 21–28 are the views of the examplary embodiements.

DESCRIPTION OF THE PARTS

Figure 1:
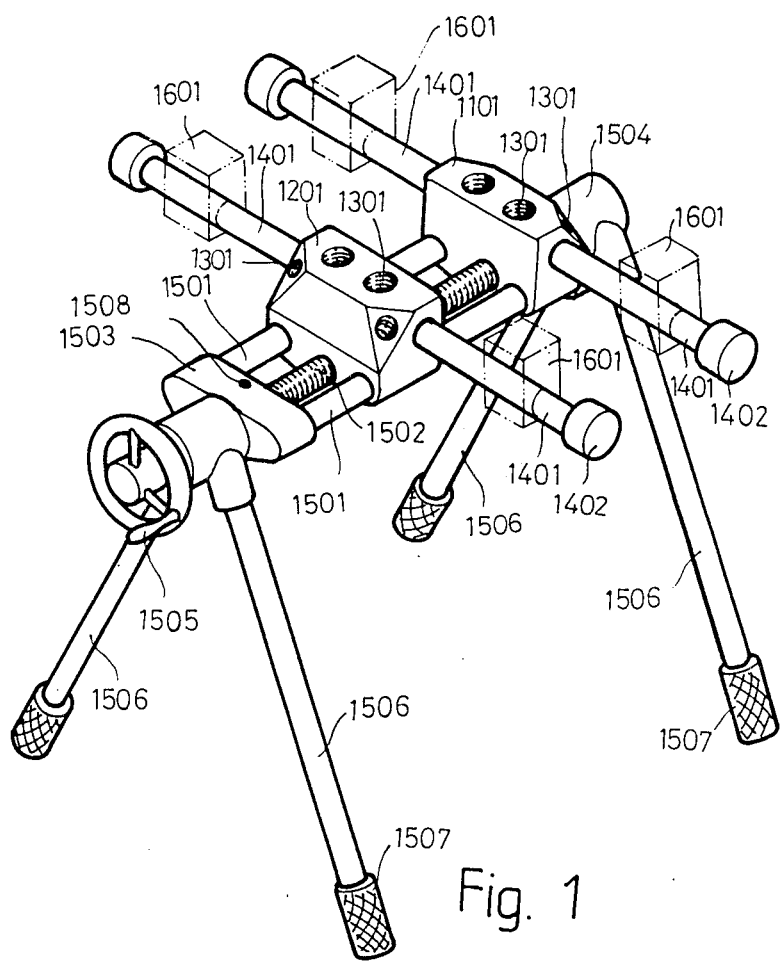
FIG. 1 is the three-dimensional view of the exemplary embodiment of the spiral coupling-type support arm double-jaw clamp work bench.
Figure 1:
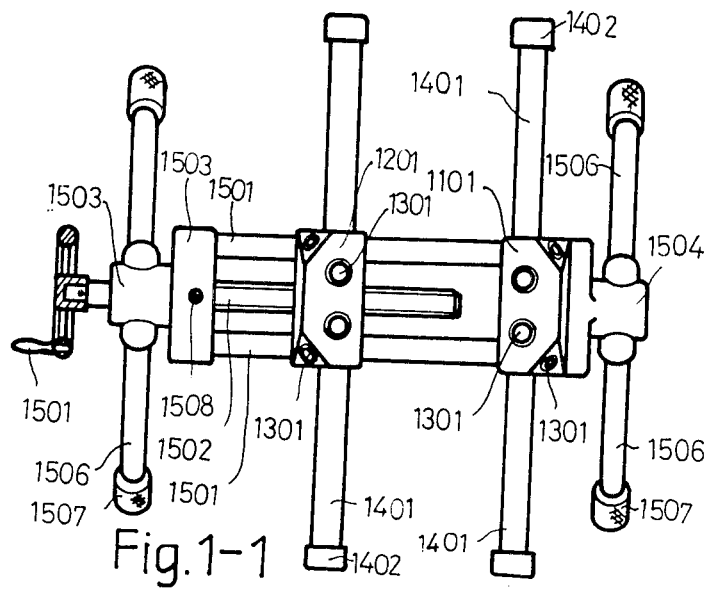

1101 Multi-faced fixed jaw with a support arm coupling hole

1102 Sideway fixed jaw with a support arm cupling hole

1103 Long strip-shape multi-faced fixed jaw with a plural coupling spiral holes.

1104 Triangular multi-faced fixed jaw with plural coupling spiral holes

1105 Square multi-faced fixed jaw with plural coupling spiral holes.

1106 Hexagonal multi-faced fixed jaw with plural coupling spiral holes.

1107 Approxamate round multi-faced fixed jaw with plural coupling spiral holes.

1108 Block-shaped multi-faced fixed jaw with plural coupling spiral holes

1109 Approximate ball-shaped multi-faced fixed jaw with plural coupling spiral holes.
1110 Rectangular three-dimensional multi-faced fixed jaw with plural coupling spiral holes.
1111 Hexagonal multi-faced fixed jaw with plural coupling spiral holes.
1112 Fixed jaw to be coupled to the rotatable support arm.
1201 Multi-faced movable jaw with a support arm coupling spiral hole.
1202 Sideway movable jaw with a support arm coupling spiral hole.
1203 Movable jaw with paralle multi-arm coupling spiral holes.
1204 Movable jaw with a rectangular support arm through hole.
1205 Support arm adjustment screw
1206 Support arm adjustment screw hole.
1207 Stagger multi-arm-type lower coupling jaw screw hole.
1208 Stagger multi-arm-type upper jaw.
1209 Stagger multi-arm-type lower jaw.
1210 Upper and lower jaws fixing screw.
1211 Upper jaw locking hole.
1212 Lower jaw locking hole.
1213 Upper jaw with through suppert arm adjustment hole.
1214 Lower jaw with through support arm adjustment hole.
1215 Movable jaw with through support arm adjustment screw hole.
1216 Movable jaw with round through support arm adjustment screw hole.
1217 Movable jaw to be universally coupled to the support arm structure.
1218 Movable jaw with a sideway through square coupling hole.
1219 Movable jaw to be coupled to the rotatable support arm.
1220 Through support-arm-type upper jaw.
1221 Through support-arm-type lower jaw.
1222 Through round hole.
1223 Movable jaw with a sideway round coupling hole.
1301 Thread hole.
1302 Through-type square support arm coupling hole.
1303 Through-type round support arm coupling hole.
1304 Through-type square support arm coupling hole.
1305 Through-type round support arm coupling hole.
1306 Through-type guide rail support arm coupling hole.
1307 Rotatable guide rail support arm coupling hole.
1308 Universal adjustable support arm ball socket seat.
1310 Ring-shaped locking nut
1317 Outer seat of the rotatable support arm coupling seat
1318 Rotatable support arm coupling hole
1319 Ring-shaped limit blocking ring with threads inside
1401 Pillar-shaped support arm with screwing threads
1402 Single hole end enclosure
1403 Double hole end enclosure
1404 Square support arm
1405 Square support arm end closure
1406 U-shaped support arm
1407 Through-type support arm with its both end in a split parallelism
1408 Parallel through-type support arm
1409 Through-type support arm with guide rails
1410 Through-type round support arm
1411 Universal adjustable round support arm
1413 Support arm with clamp claw rotation guide threads
1414 Outer section of the rectractable support arm with clamp claw rotation guide threads and positioning hole.
1415 Inner section of the retractable support arm with a positioning hole
1416 Positioning pin
1417 Positioning hole
1418 Positioning pin hole
1419 Pillar-shaped support arm with the operational handle and screwing and coupling threads
1420 Plug with a screw hole inside provided on the end of the hollow support arm
1421 Fixing screw of plug 1420
1422 Outer section of the retractable support arm
1423 Guide screw positioning limit plug with a round hole in its middle part provided in the end of the auter section of the retractable support arm
1424 Fixing screw of plug 1423
1425 Guide screw
1426 Guide screw positioning limit pin
1427 Handle
1501 Tubular guide rails of the machine body
1502 Drive guide screw of the movable jaw
1503 Front connection block
1504 Rear connection block
1505 Operational handle of the guide screw
1506 Tripod
1507 Tripod bottom enclosure
1508 Guide rod positioning screw
1509 Rear connection block with a coupling round hole
1510 Guide rail connection block with a coupling round hole
1511 Backing screw with a handle
1512 Front connection round hole with a coupling round hole
1513 Lengthway rotatable guide rail connection block
1601 Rotable separate clamp claw
1602 Guide rod drive-type flat board-shaped rotatable clamp claw
1603 Slide adjustable and locking flat board-shaped rotatable clamp claw clam machine seat
1604 Clamp machine seat with a longthway compling hole in its bottom part
1605 Fixing screw of the clamp machine seat
1606 Guide screw
1607 Guide screw operational handle
1608 Support arm with a thread hole in the machine seat
1609 Movable jaw
1610 Guide rail
1611 Movable jaw sliding stabilization block
1612 Rotatable clamp claw
1613 Central rod of the rotatable clamp claw
1614 Central round hole of the movable jaw
1615 Sideway hole of the movable jaw
1616 Positioning outer buckle ring 1617 Clamp claw base seat lengthway square sliding hole
1618 Clamp claw base seat lengthway sliding hole
1619 Clamp friction plate
1620 Inner threads hole
1621 Disc-shaped clamp claw with a threads hole
1622 Cylindrical sleeve with a sliding face on its one end and with threads and a notch on its another section
1623 Nut with an inclined plane inner screw
1624 Handle to be coupled to the threads of the sleeve 1622
1625 Ring-shaped sliding clamp claw with a round hole in its middle part
1626 Friction plate
1627 Slidable clamp claw with a sliding hole in the base seat
1628 Fixing screw of the slidable clamp claw 1627
1629 Adjustable blocking block
1630 Fixing screw of the slidable blocking block 1629
1631 Disc-shaped clamp claw with plural sets separate clamp claws
1632 Locking screw
1633 Separate clamp claw screw hole
1634 Drive handle of the separate drive calmp claw
1635 Movable claw of the separate drive clamp calw
1636 Base seat
1637 Sideway locking screw
1638 Lengthway threads hole
1639 Guide screw
1640 Clamp claw
1641 Outer buckle ring
1642 Bench with parallel holes
1643 Locking slot of the bench plane
1644 Parallel holes in the back of the bench.

DETAILED DESCRIPTION OF THE PRESENT INVENTION

Figures 1, 2:
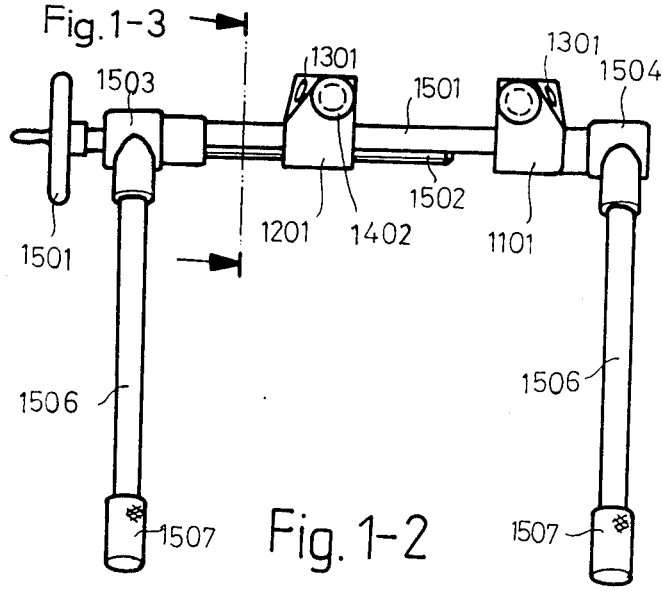
Figures 1, 2, 3:
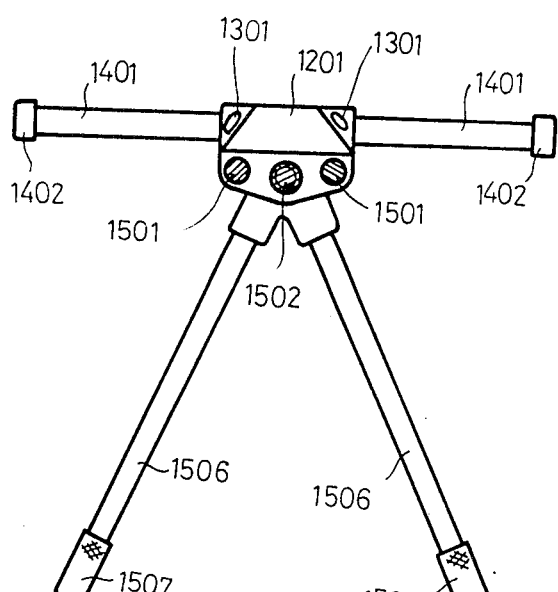

The object structive of the present invention is the clamp work bench to clamp the work pieces, and its features i.e. in that it has the djustable support arms and the ability to conduct the three-dimensional clamp. Based on the above-said features, the structure and mutual acceptable design changes of the present invention are described in conjunction with various examplary embodiments as follows:

In the examplary embodiments as shown in FIGS. 1 and 1-1, 1-2, 1-3, mainly a set of the front connection block 1503 with the tripod 1506 and the other set of the rear connection block 1504 are combined by the tubular guide rail 1501 of the machine body, a multi-faced fixed jaw 1101 with the support arm coupling screw holes is provided on one side of said rear connection block 1504, and a multi-faced movable jaw 1201 with the support arm coupling screw holes horizontally passes over said tubular guide rail 1501 of the machine body, a movable jaw drive screw 1502 lengthwisely passes through said front connection block 1503 and rear connection block 1504 and then couples the lengthwise through screw hole on the bottom of said multi-faced movable jaw 1201 with the support arm coupling screw holes, the drive screw 1502 of said movable jaw has a concave ring-shaped slot which accepts the limitations of the guide rod positioning screw 1508 of said front connection block 1503 to execute the lengthwise position restrictions, the guide screw opertional handle 1505 and said drive screw 1502 of said movable screw are connected, when said operational handle 1505 is cranked, under the restriction for said guide rod positioning screw 1508 of said front connection block 1503, said drive screw 1502 of said movable jaw can make any lengthwise advances and backward movements, thus said movable jaw 1201 with the support arm coupling screw holes can make lengthwise advances and backward movements along said tubular guide rail 1501 of the machine body; threaded holes 1301 provided in said multi-faced fixed jaw 1101 with support arm coupling screw holes and said multifaced movable jaw 1201 with support arm coupling screw holes respectively is to accommodate the pillar-type support arm 1401 with the screwing threads to be turned in and matched thereon, the rotatable separate clamp claws 1601 provided on said pillar-type support arm 1401 can independently and axially slide along the support arm shaft and can also make reciprocating drive movements axially along the support arm shaft;

Based on the above description, we may easily know this said examplary embodiment has the following actions:

The rotatable separate clamp claws 1601 attached on the support arm of the same set of said jaws can constantly make reciprocating drive movements toward the jaws;

The three-dimensional clamp is made possible, the selection of the multi-lateral holes in said multi-faced fixed jaw 1101 with the support coupling screw hole and in said multi-faced movable jaw 1201 with the support arm coupling screw holes makes said pillar-type support arm 1401 with the screwing threads become horizontal, V-shaped or other form, hereby clamping different work pieces;

The movable jaw drive screw 1502 can conduct the reciprocating drive movements between said two jaws; Therefore, these three actions can firmly clamp and hold any work pieces in block, plate, rod, round, ball shapes as the features of the design of the present invention.

FIGS. 2 and 2-1, 2-2, 2-3 are the examplary embodiment shown in FIG. 1 with the following fearther features:

Said front connection block 1503 and rear connection block 1504 are replaced by a rotatable two-stage structure of which the rear connection block 1509 with coupling round holes and the lengthwise rotatable guide rail connection block 1510 are used to replace said rear connction block 1504, and the front connection block 1512 with the coupling round holes and the lengthwise rotatable guide rail connection block 1513 are used to replace said front connection block 1503;

said multi-faced fixed jaw 1101 with the support arm coupling screw holes, said multi-faced movable jaw 1201 with the support arm coupling screw holes, movable jaw drive screw 1502, tubular guide rail of the machine body, lengthwise rotatable guide coupling blocks 1510, 1513 constitute the machine body structure which makes the rotatable adjustments on the centrol axis between and formed by, an said rear connection block 1509 with the coupling round holes and said front connection block 1512 with the coupling round holes, to freedy change the horizontal angle of a work piece after a work piece is clamped, hereby expediting the work, and the locking screw 1511 with a handle is to leosen and adjust the horizontal angle of the work piece and then firmly lock the work piece upon completion of the required adjustments.

In the above various exemplary embodiments, said support arm sets are screwed and fixed in the spiral holes in various respective jaws. Thus, except disassembly or assembly, the relationship between said support arms and jaws cannot be adjusted, to further adapt to various work conditions, various multual compatible structural designs for the jaws and support arms are described as follows:

As shown in FIGS. 2-4, 2-5, there is the examplary embodiment of the structure for the through connection of the square support arm and jaw, in which the movable jaw 1204 with the square support arm through hole has a sideway square coupling hole 1302, an adjustment screw hole 1206 communicable to said hole 1302, is provided on said movable jaw to accommodate said support adjustment screw 1205 to be screwed therein, so when said support arm adjustment screw is loosemed, the square support arm can be made for slide adjustments, and when said support arm adjustment screw is up tifhtly, said square support arm can be firmly fixed.

FIGS. 2-6, 2-7 is the examplary embodiment of the structure of the stagger through-type adjustable support arm, in which the jaw is a two-block-type structure, of which the through support arm-type upper jaw 1220 has a round hole 1222, two through-type square support arm coupling slots 1304 are provided on the bottom face, a stagger multi-arm lower coupling screw hole 1207 is provided in the middle of said through support arm-type lower jaw 1221 that has two through-type square support arm coupling slots 1304, and the square support arms 1404 are placed in the coupling slots 1304 respectively, the support arm adjustment screw 1205 passes through the round hold 1222 and is then turned into the lower coupling jaw screw hole 1207, the slackening and tightening of the support arm adjustment screw 1205 makes the jaw of the support arm through hole appear in the adjustable or locked status.

The examplary embodiments shown in FIGS. 2-8, 2-9 are in the screwing parallel multi-arm structure, the Parallel multi-arm is installed with the clamp structure 1601 which can slide on the parallel multi-arm for position adjustments, two thread holes 1301 are provided on each of the two sides of said movable jaw 1203 with said parallel multi-arm coupling screw holes respectively to accomodate the pillr-shaped support arm 1401 with screwing threads to be screwed in, two parallel pillar-shaped support arms 1401 are provided with the clamp structure 1601, and the two hole and enclosared 1403 are to stabilize the ends of the pillar-shaped support arm 1401 of the two sets and also to restrict the clamp structure 1601.

FIGS. 2-10, 2-11 are the examplary embodiments of the through-type adjustable parallel multi-arm structure, the features of which lie in that they have a single arm middle through section to accommodate and couple the jaw, two ends of which has a parallel split support arm 1407 to be installed with the clamp structure 1601, as shown in said drawings, the upper jaw 1213 with a through support adjustment hole is provided with the support arm adjustment screw hole 1206 to accommodate the support arm adjustment screw 1205 to be screwed therein, its side is also provided with the upper jaw fixing pin hole 1211 to accommodate the upper and lower jaw fixing screw 1210 to go through and to be screwed and coupled to the lower jaw screw hole 1212 in the lower jaw 1214 with a through support arm adjustment hole, thus connecting the upper and lower jaws 1213, 1214 of the through support arm adjustment hole; the lower side of the upper jaw 1213 of the adjustment hole and the upper side of the lower jaw 1214 of the adjustment hole and a sideway through-type round support arm coupling slot 1305 are to accommodate the support arm 1407 with the two through-type ends in a split parallelism for the left and right sideway adjustments when the support arm adjustment screw 1205 is unscrewed, or for the adjustments of horizontal and inclined angles of the parallel arms, so such adjustments can be applicable to a wider scope of the irregular shaped work pieces.

FIGS. 2-12, 2-13 are the examplay embodiments of the stagger through adjustment parallel multi-arm structure, the features of which lie in that they have the U-shaped support arm 1406 mutually crossing sideway to couple the jaw seat which is comprised by the stagger multi-arm upper jaw 1208 and lower jaw 1209, a round hole 1222 is provided in the middle of said stagger multi-arm upper jaw 1208 to accommodate the support arm adjustment screw 1205 to go through therein, its lower side is provided a through round support arm coupling slot 1305, a screw hole 1207 is provided in the middle of stagger multi-arm lower jaw 1209 to accommodate the support arm adjustment screw 1205 to be screwed and coupled therein, its upper side has a number of sets of the through round support arm coupling slots 1305 to jointly with the coupling slot 1305 in the lower side of the stagger multi-arm upper jaw 1208, couple U-shaped support arm 1406, thus making said U-shaped support arm 1406 slide between them.

FIGS. 2-14, 2-15 show the examplary embodiments of the slidable adjustment structure with the through-type round holes and parallel support arms, the features of which lie in the parallel support arm set 1408 passes through the stagger multi-arm upper and lower jaws 1208, 1209 as shown in FIGS. 2-12, 2-13, and the slackening and tightening of said support arm adjustment screw 1205 is used to adjust or firmly lock said parallel support arm set 1408 which may be composed by flat long closed ring shape or two parallel rods.

FIGS. 2-16, 2-17 show the examplary embodiments of the through-type support arm structure 1409 with the guide rail guide rod and clamp block, the features of which said support arms 1409 have to parallel guide rails, a movable jaw 1609 is provided on each of the left and right sides of the said support arms 1409 respectively, the two guide screws are miserted therein from the left and right side respectively, the lenghth of the guide screws is ½ longer than that of the support arm, two guides screws are installed in parallel and stagger way, and a handle is provided on the left side or right side of said respective guide screws, a pin hole is provided on both ends of the through support arms to accommodate the guide screw positioning pin to make said guide screw merely rotate itself and the movable jaw 1609 on the guide rails conduct the reciprocating displacements when the guide screw is rotated, the jaw 1218 that couples the guide rail through-type support arm 1409 has a sideway hole to accommodate the support arm 1409 to go through and couple from the top, sides or bottom of said support arm which also has the support arm adjustment screw hole 1206 and the support arm adjustment screw 1205 to loosen or firmly lock the guide rail through-type support arm 1409 for adjustments or fixation.

FIGS. 2-18, 2-19 show the examplary embodiments of the structure of the jaw seat with the through round hole coupling round hole slidable adjustment support arm 1410, in said drawings, the jaw 1223 with a sideway through hole has a support arm adjustment screw hole 1206 communicable to the through-type round support arm coupling hole 1303 and is screwed and coupled by the support arm adjustment screw 1205 to make the through-type round support arm 1410 whihc is installed with the clamp structure 1601 sidewisely pass through the above-said coupling hole 1303; the slackening and tightening of said support arm adjustment screw 1205 can firmly lock the round support arm 1410 or lossen the round support arm 1410 for the sidewise displacement adjustments or rotational adjustments.

FIGS. 2-20, 2-21, 2-22, 2-23 show the examplary embodiments of the rotatable support arm structure, the features of which lie in that the outside configuration of the removable jaw 1219 that couples the rotatable support arm is in a round pillar-shaped or multi-faced approximate ring-shaped movable jaw structure, one side of said structure has a larger diameter ring-shaped terraced lateral edge, and the other side has threads to be screwed in by the ring-shaped restrictive blocking ring 1319 with threads inside, a set of rotary coupling support arm inner seat 1307 and a set of rotary coupling support arm outer seat 1317 are sleeved on said movable jaw structure 1219 in a pillar-shaped or multi-faced approximate ring-shaped outside configuration, each of said rotary coupling support arm seats 1307, 1307 has a through screw hole 1318 caoxial with said support arm respectively to accommodate the thread support arm, the thread of the support arm is longer, so after the support arm that is screwed in the inner seat 1307 of said screwing support arm coupling seat passes through said seat 1307, said support arm can tightly pack said movable jaw 1219, and after the support arm that is screwed in the outer seat 1317 of the rotary support arm coupling seat passes through said inner seat 1317, said support arm can tightly pack said inner seat 1307, hereby making the angle formed by said two support arms become stabilized.

FIGS. 3-1, 3-2, 3-3 show the examplary embodiments of the spiral coupling-type support arm long strip-shaped single jaw clamp work bench, the features of its construction lie in that it has a multi-faced fixed jaw 1103 with a long strip-shaped legthway multi-coupling thread holes, a thread hole 1301 is provided in each of its various faces respectively to accommodate the pillar-shaped support arm 1401 with the screwing and coupling threads to be firmly screwed therein, the screwing and fixing position of the support arm 1401 depends on the shapes of the work pieces by properly selecting the screwing and coupling position and the angle, and the features of its structure are as follows:

a long strip-shaped multi-faced fixed jaws 1103 lengthway with the multiple sets of the coupling spiral holes serves as the body of the work bench, a tripod is installed under said jaw 1103, a thread hole 1301 is provided in each of various faces of the body to accommodate the pillar-shaped support arm with the screwing and coupling threads to be screwed and fixed therein;

a pillar-shaped support arm 1401, one end of which has threads to be screwed and fixed in the thread hole 1301 of said fixed jaw 1103;

a rotatable separate clamp claw 1601 which is coupled on the pillar-shaped support arm 1401 with the screwing and coupling threads.

Figure 2:
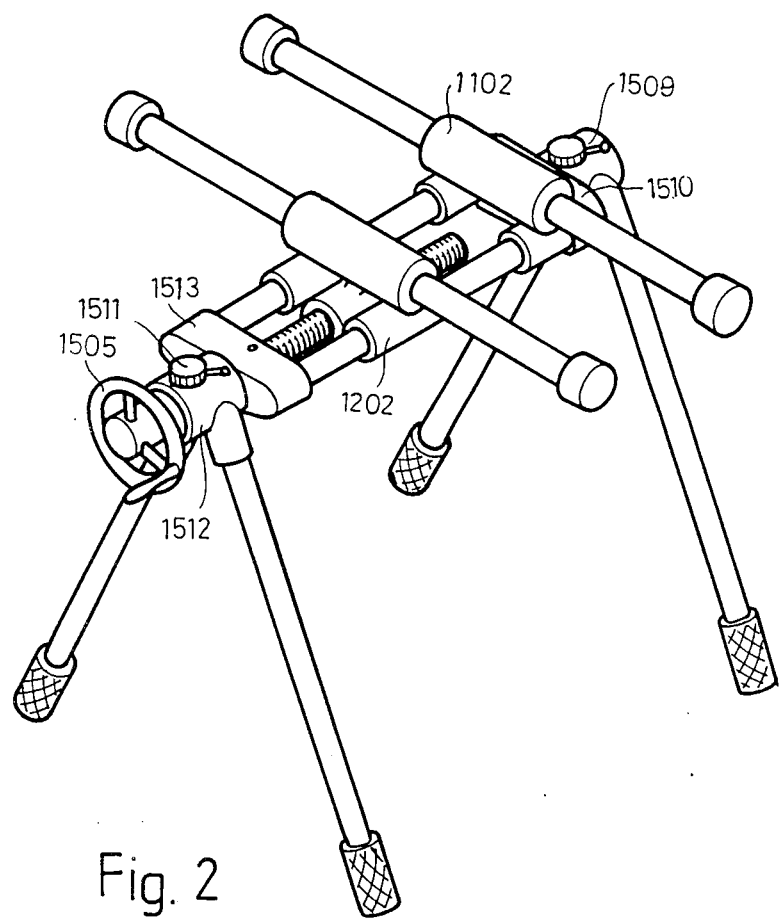
Figures 1, 2:
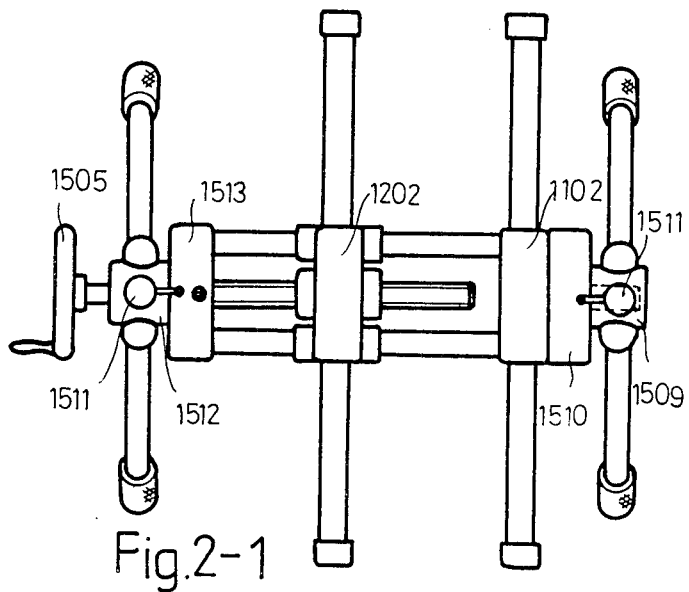
Figure 2:
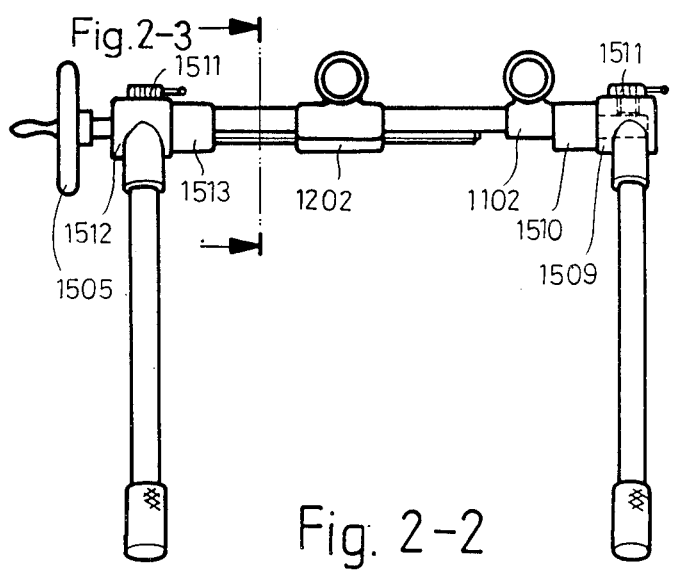
Figures 2, 3:
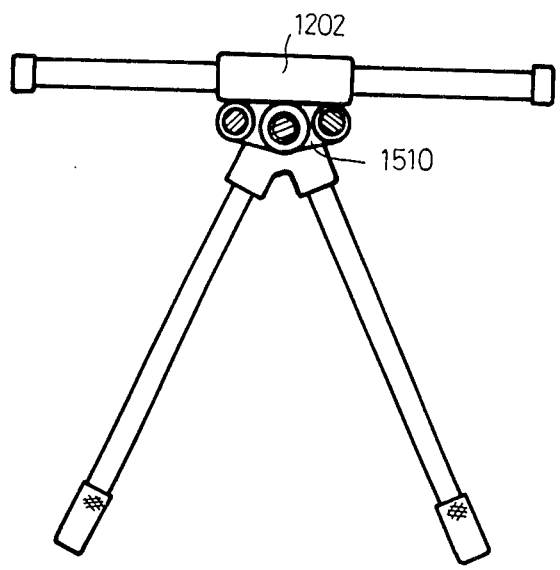
Figures 2, 3, 4, 5, 6, 7, 8, 9, 10, 11, 12, 13, 14:
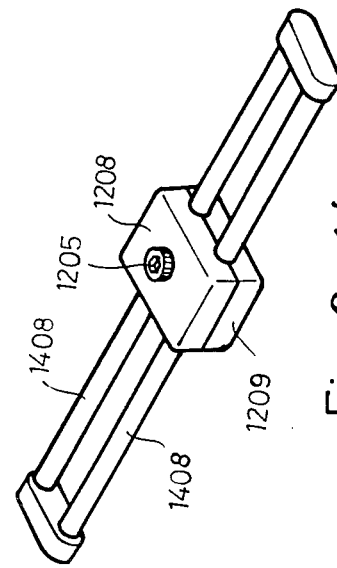

Further structural examplary embodiments of the above-said long strip-shaped multi-faced fixed jaw 1103 with multiple coupling spiral holes may be the triangular long strip-shaped structure as shown in FIGS. 3-4, 3-5; or the square long strip-shaped structure as shown in FIGS. 3-6, 7-7; or the hexagonal long strip-shaped structure as shown in FIGS. 3-8, 3-9; or the approximate round long strip-shaped structure as hown in FIGS. 3-10, 3-11, 3-11; or other strip-shaped structured constituted by proper geometrical forms with plural sets of thread holes 1301 to properly select the position and angle of the support arm 140k, hereby making the most practical clamp on the work pieces.

FIGS. 4, 4-1, 4-2 show the examplary embodiments of the spiral coupling-type support arm block-shaped single jaw clamp work bench, the features of its construction lie in that it has a multi-faced fixed jaw 1108 with the block-shaped multiple coupling spiral holes, a thread hole is provided in each of its various faces to accommodate the pillar-shaped support arm 1401 to be screwed and fixed therein, the screwing and fixing position of said pillar-shaped support arm 1401 depends on the shapes of the work pieces by selecting the proper screwing and coupling position and angle, and its structural features are as follows:

a block-shaped multi-faced fixed jaw 1108 with multiple spiral holes serves the body of the work bench, a tripod is provided under said fixed jaw 1108, a spiral hole 1301 is provided in each of various faces of said body to accommodate the pillar-shaped support arm 1401 with the screwing and coupling threads to be screwed and fixed therein;

the pillar-shaped support arm 1401 with the screwing and coupling threads, one end of which has threads to be screwed and fixed in the thread hole 1301 in the said multi-faced fixed jaw 1103 with the multiple coupling spiral holes;

the rotatable separate clamp claw 1601 which couples the pillar-shaped support arm 1401 for clamping and driving.

The further examplary embodiments of the structure of the above-said multi-faced fixed jaw 1108 with the multiple coupling spiral holes may be the approximate ball-shaped block structure as shown in FIGS. 4-3, 4-4; or the square three-dimensional block structure as shown in FIGS. 4-5, 4-6; or the hexagonal three-dimensional block structure as shown in FIGS. 4-7, 4-8; or other proper multi-faced block geometric shape with a multiple set of thread holes 1301 to select the position and angle for the pillar-shaped support arm 1401 with screwing and coupling threads.

FIGS. 5, 5-1, 5-2, 5-3 show the examplary embodiments of the structure the universal adjustable support arm, the feature of this structure lie in that the ball-shaped and of said universal adjustable support arm 1411 can couple the ball sockat seat 1308 on the movable jaw 1217 of the said universal adjustable support arm structure, and the ring-shaped locking mut 1310 makes the lossening adjustments and screwing and tightening.

The afore-mentioned structure can be the structure in a reverse way, i.e. in the structure that said jaw is provided with the ball-shaped pillar and ring-shaped locking nut, and the universal adjustable support arm 1411 is provided with the ball socket seat.

Further the structure may be also provided a rotatable separate clamp claw 1601 to clamp the work pieces; the structure of said rotatable separate clamp claw 1601 can use in many structural examplary embodiments of the commorcialized clamp structures, but this only needs to modify their base seat to be slidable along, and firmly locked on, the support arm, however, in actual applications, to further expand the convenience and versatility of the design of the present invention, the following various clamp structures are specially designed:

FIGS. 6, 6-2 shown the examplary embodiments of the clamp block to be coupled to the round or single arm or parallel multiple support arms, the features of this structure lie in that a base seat with the clamp machine seat 1604 with the lengthway coupling holes to be coupled to the support arm for making the lengthway distance adjustments, the support arm 1608 with a thread hole is provided on the outer side of the clamp machine seat 1604 to be screwed in with the guide screw 1606, one end of said guide screw 1606 has an operational handle 1607, its other end has a ring-shaped slot to couple the back hole in the movable jaw 1609 and then to be firmly locked by a sideway screw, the bottom silde stabilization block 1611 of the movable jaw is coupled to the guide rail 1610 of the clamp machine seat 1604 with the lengthway coupling hole, the front end of said block 1611 has a central hole 1614, thus forming a clamp structure with independent drive functions, the slackening and tightening of the locking screw 1605 operates and controls the clamp base seat to make the lengthway position adjustments along the support arm, and the operation of the guide screw can tightly calmp the work pieces, the shape of the lengthway coupling hole in the clamp machine base 1604 depends on the support arm to become a corresponding the structure of round, square or multi-angular multi-arm shape, as shown in said drawings, the slide adjustable and firmly locking flat board-shaped rotatable clamp claw 1603 is not procided with any guide rod, a rotatabe clamp claw 1612 may be provided on the body of clamp machine base 1603, a coupling hole and a fixing screw 1605 are provided on the bottom of said clamp calw to slide or also to be locked in the support arm.

FIGS. 7, 7-1, 7-2 show the examplary embodiments of the structure of the rotatable disc-shaped clamp claw to couple the round support arm, as shown in said drawings, the feature of this structure are as follows:

- it has the support arm 1413 with the clamp claw rotational guide threads;
- it has a disc clamp claw 1621 with a thread hole, an inner thread hole 1620 is provided at its center, a clamp frictional plate 1619 is provided on the front rim of said clamp claw;
- the disc-shaped clamp claw 1621 which can move forward and backward along the support arm 1413 to clamp the work pieces.

FIGS. 8, 8-1, 8-2 show the examplary embodiments of the structure of the rotatble disc-shaped clamp claw of the retractable round support arm with, a positioning hole, this examplary embodiment is the structural examplary embodiment of the clamp work bench with the two-stage support arm, positioning hole and positinning pin to rapidly select the right positions, the features of its structure are as follows:

- the retractable support arm, is its inner section 1415, the positioning hole is provided to couple the through-type round support arm coupling hole 1303 of jaw, a positioning hole 1417 is provided in said support, the outer section 1414 of said retractable support arm has the clamp claw rotational guide threads and positioning hole to be sleeved on and matched with the said inner section 1415-for retractabe adjustments, the positioning pin 1416 passes through said positioning pin 1417 and positioning pin hole 1418 and then is screwed on and coupled to the rotatable disc-shaped clamp claw structure on the outer section 1414 of said retractable support arm with a positioning hole, hereby making the rotatable forward and backward movements to clamp and hold the work pieces.

FIGS. 9, 9-1, 9-2 show the examplary embodiments of the structure of the disc-shaped clamp claw with a positioning seat to be coupled to the round or multi-faced support arm, the features of this structure lie in that the frictional plate 1626 is provided on the front side of the ring-shaped slide clamp claw 1625 with a round hole in its middle part, said round hole in its middle part coules and slides on the cylindrical sleve 1622, one end of said sleeve 1622 has a slide face and its other end has threads and an opening, the handle 1624 is screwed on and coupled to the section with threads of the sleeve 1622, the nut 1623 is crewed on and coupled to the side with thread and an opening of said sleeve 1622, said sleeve 1622 is sleeived on the support arm for the movement adjustments, the screwing and tightening of said nut 1623 firmly locks said sleeve 1622 and pillar-shaped support arm 1401, then rotary movements of said handle 1624 drives the said ring-shaped slide clamp claw 1625 with a round hole to clamp and hold the work pieces.

FIGS. 10, 10-1, 10-2 show the examplary embodiments of the structure of the clamp claw with a positioning block to be coupled to the round support arm, the features of the structure lies in that a central shaft is provided on the front side of the slidable clamp claw 1627, its base seat has a lengthway slide hole 1618 and a fixing screw 1628, the adjustable blocking block 1629 is simultaneously coupled to the support arm side and also placed on the inner or outer side of the clamp claw set, a fixing screw 1630 is provided on said clamp claw to loosen, adjust and fix the said clamp claw on said support arm, a longer thread is provided at the front end of the support arm to be screwed in the thread hole in said jaw, its outer end has a handle for making rotary adjustments, when a user wants to clamp a work pieces, he firstly loosens the fixing screw 1628 of the slidable clamp claw 1627 to push said slidable clamp 1627 toward the work piece, and he then loosens the fixing screw 1630 of the adjustable blocking block 1629 to push said slidable clamp claw 1627 firmly relocking said fixing screw 1630, when the handle is turned to make said support arm advance, said support arm can pack the adjustment blocking block 1629 which, in turn, drives the said slidable clamp claw 1627 to clamp and hold the work pieces, if the user wants to the claw to press outwardly from the inside direction, he adjusts and places the blocking block 1629 in the inner side of the said slidable clamp claw 1627 in the operational manner same as the above described.

FIGS. 11, 11-1, 11-2 show the examplary embodiments of the drive structure of the retractable tubular-type clamp claw to be coupled to the square support arm, the features of this structure lie in that said clamp claw has a two-stage retractable pipe, the structure of which comprises:

the square support arm 1404 which is coupled to the through-type round support arm coupling hole 1303 of the jaw, the end of said jaw close to the outer side has a plug 1420 with a thread hole inside, and said plug 1420 is fixed by a fixing screw 1421 that is provided on the later side to serve as the fixing screw for said Pluf 1420;

the outer section 1422 of said retractable support arm, which is sleved on said square support arm 1404, the inner side of said section 1422 is coupled to bass seat with said lengthway slide hole 1617 and said fixing screw 1628 of said slidable clamp claw 1627, and the front side of said section 1422 is provided with a shaft to be installed with a rotable clamp claw;

the guide screw positioning limit plug 1423 which is fixed by said fixing screw 1424 provided on the lateral side;

the guide screw 1425 with a handle its outer side, which is inserted and screwed in and coupled to the thread hole in the plug 1420 with a screw hole inside, the positioning pin 1426 provides the positions for said guide screw 1425 and said positioning limit plug 1423 to drive, during the rotational movements, said retractable support arm outer section 1422 which, in turn, dirves the base seat which has the slidable clamp claw 1627 with slide holes to effect the clamp functions.

FIGS. 12-1, 12, 12-2 show the examplary embodiments of the structure of the disc-shaped claw clamp with multiple sets of separate drive clamp blocks to be coupled to the round support arm, the features of this structure lie in that the disc-shaped clamp claws 1631 to separately drive the clamp claw are provided on the through-type round support arm 1410, a round hole is provided in the middle part of said dis-shaped clamp claw 1631 which is coupled to said round support arm 1410 for slide displacements, a locking screw 1632 is provided on its lateral side for locking and loonsening, a through screw hole 1633 is provided in the disc plane to accommodate the drive handle 1634, a movable calw 1635 is provided close to the inner side of said drive handle 1634 that independently drives the clamp claw, its outer side has a handle for drive adjustments, when the user wishes to use said clamp claw to clamp a work pieces, firstly he loonsens the screw hole 1633, pushes said disc-shaped clamp claw 1631 to the work piece, then locks the screw hole 1633, and finally uses drives said drive handle 1634 to clamp the work piece.

FIG. 12-3 shows the examplary embodiment of the disc-shaped clamp claws of two sets of the separate drive support arms.

FIG. 12-4 shows the examplary embodiment of the disc-shaped clamp claws of six sets of the separate drive support arms.

FIG. 12-5 shows the examplary embodiment of the rectangular clamp claws of two sets of separate drive support arms.

FIGS. 13, 13-1, 13-2, 13-3 show the examplary embodiments of the clamp claw with a stabilization hole to be coupled to the support arm, the features of this structure lie in:

the base seat 1636 of said clamp structure has a hole to be coupled to the support arm, the lower of said base seat 1636 has a lengthway thread hole 1638 parallel to the support arm to accommodate the drive guide screws 1639 with a handle on its outer side to be screwed in;

a hole is provided in the bottom of said clamp claw 1640 for the coupling slide of the support arm, another hole that is concave in its middle part and larger in its front part and sun aller in its rear part is provided in the upper part of said clamp claw 1640 to couple the end of the ring-shaped slot in said guide screw 1639, so the outer buckle ring 1641 can rotatably make the required combination without any slip-off.

The above-said structure may be further like that as shown in FIGS. 14, 14-1, 14-2, i.e. a thicker clamp claw 1640 forms a movable jaw, a central round hole 1614 is provided from the top to the bottom of said jaw, a sideway hole 1615 is provided in a lateral way, the central shaft 1613 with a cap in a larger diameter is placed in said jaw from its top and passes through a fixed or rotatable clamp claw 1612 and central round hole 1614 and protrudes outside of said sideway hole 1615, the protruding part of said central shaft 1613 has a concave ring-shaped slot to accommodate said positioning outer buckle ring 1616.

Figures 2, 3, 4, 5, 6, 7, 8, 9, 10, 11, 12, 13, 14, 15:
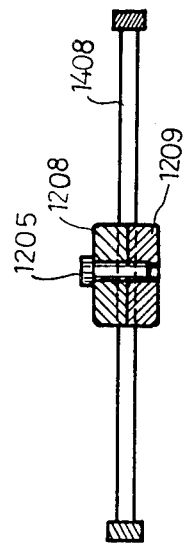
Figures 2, 3, 4, 5, 6, 7, 8, 9, 10, 11, 12:
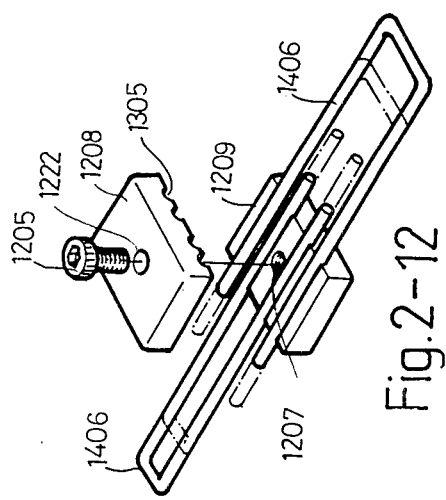
Figures 2, 3, 4, 5, 6, 7, 8, 9, 10, 11, 12, 13:
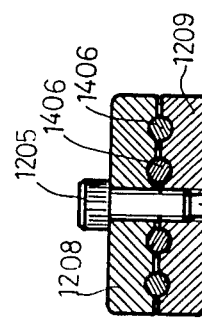
Figures 2, 3, 4, 5, 6, 7, 8, 9, 10, 11, 12, 13, 14, 15, 16, 17, 18, 19, 20:
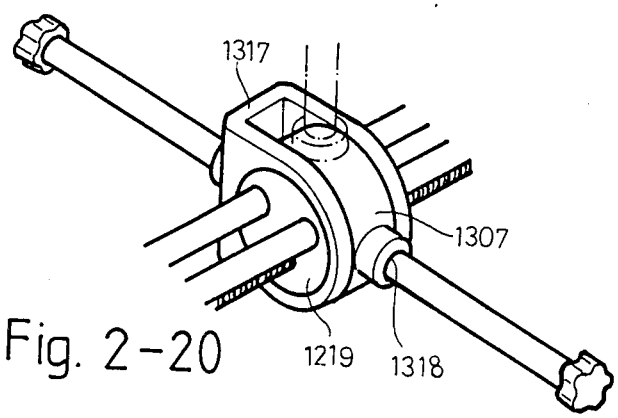
Figures 2, 3, 4, 5, 6, 7, 8, 9, 10, 11, 12, 13, 14, 15, 16, 17, 18, 19, 20, 21:
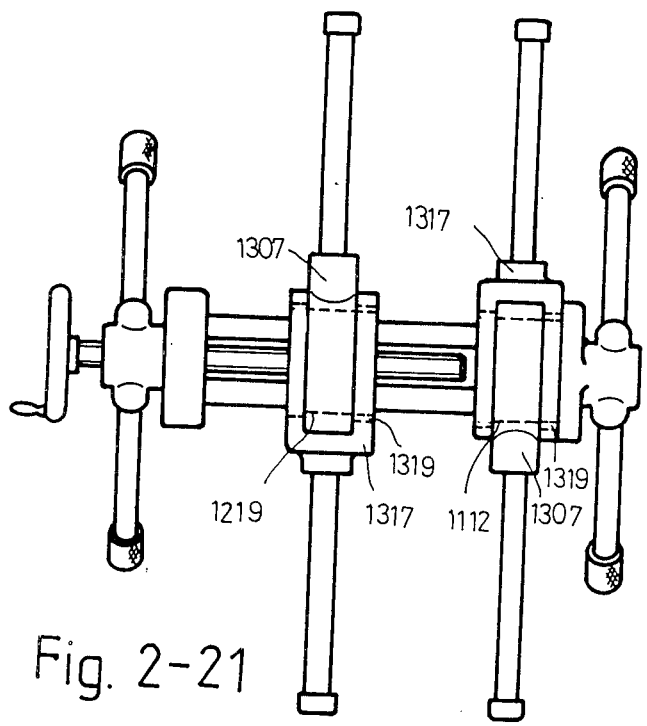
Figures 2, 3, 4, 5, 6, 7, 8, 9, 10, 11, 12, 13, 14, 15, 16, 17, 18, 19, 20, 21, 22:
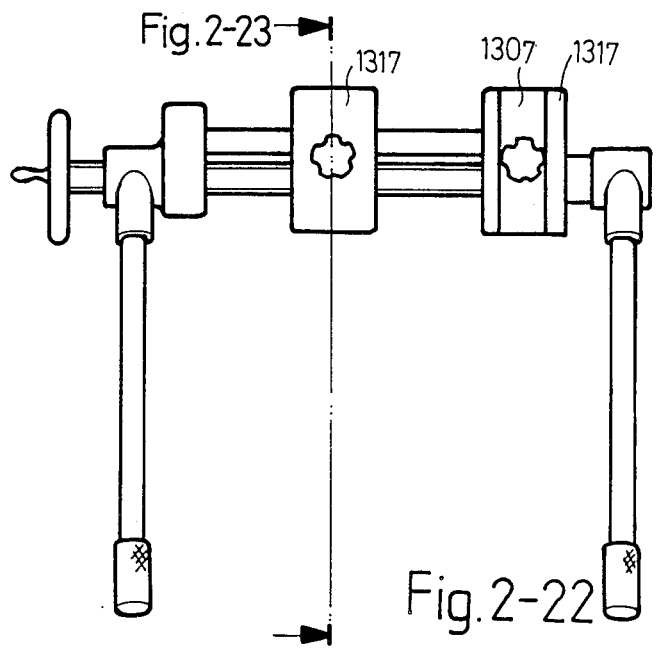
Figures 2, 3, 4, 5, 6, 7, 8, 9, 10, 11, 12, 13, 14, 15, 16, 17, 18, 19, 20, 21, 22, 23:
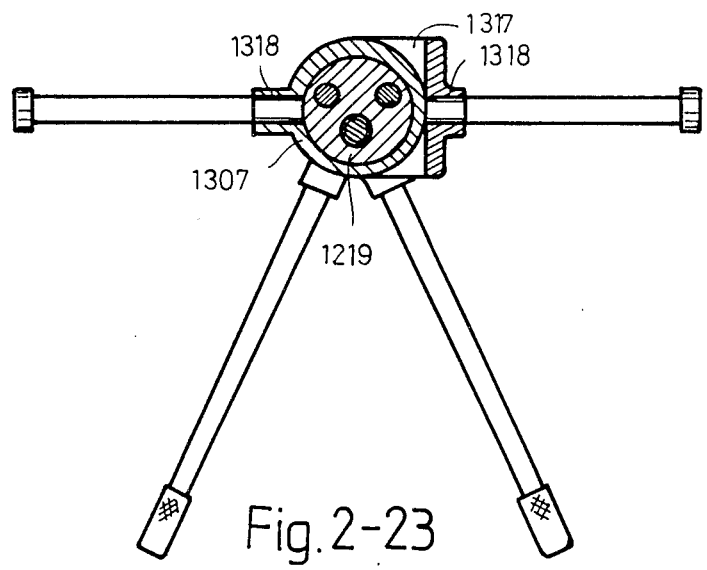
Figure 3:
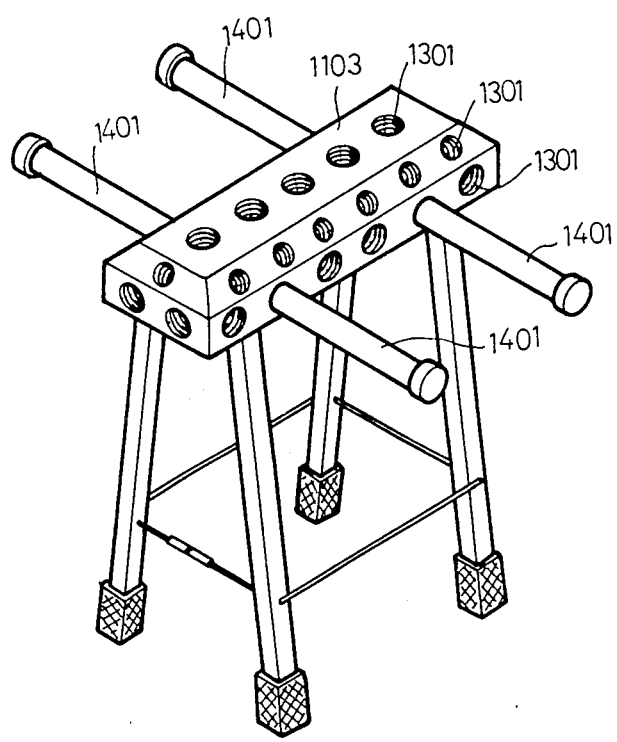
Figures 1, 3:
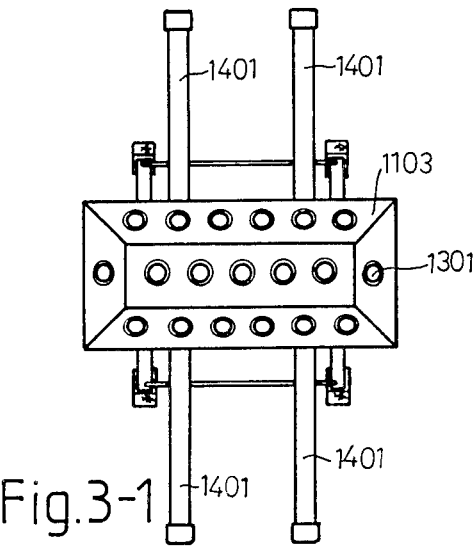
Figures 2, 3:
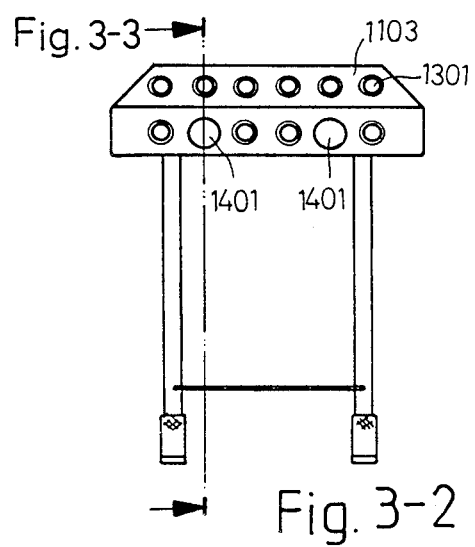
Figure 3:
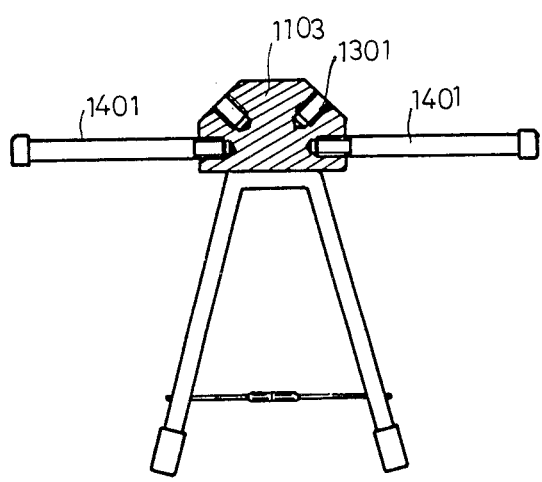
Figures 3, 4, 5:
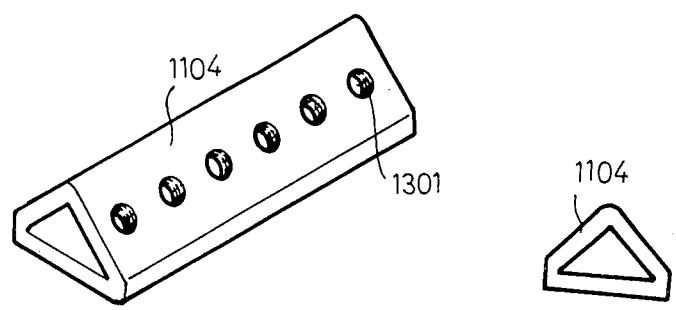
Figures 3, 4, 5, 6, 7:
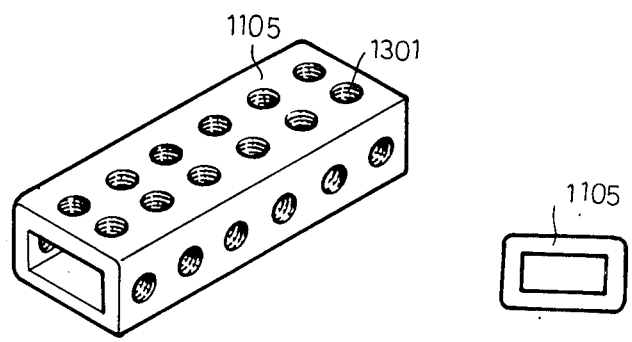
Figure 4:
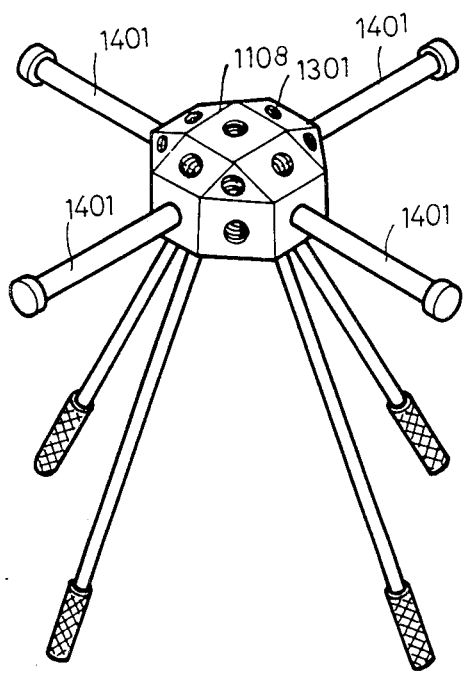
Figures 1, 4:
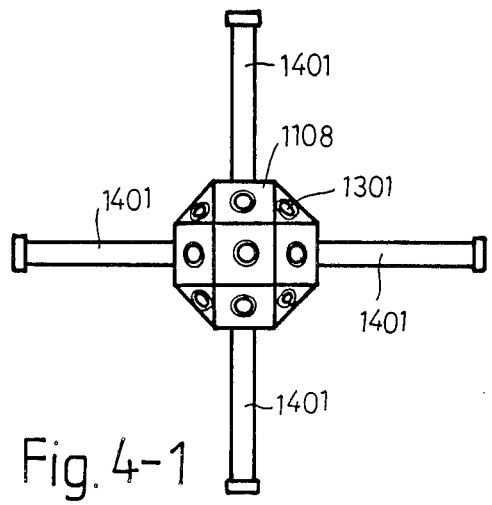
Figures 2, 4:
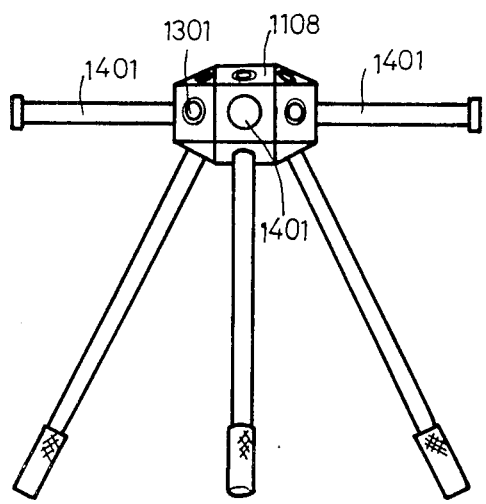
Figures 3, 4:
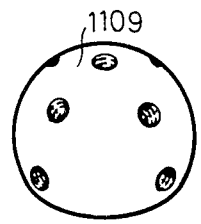
Figure 4:
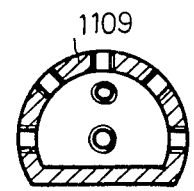
Figures 4, 5:
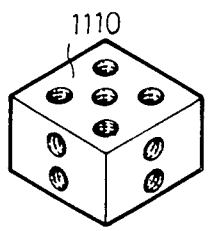
Figures 4, 5, 6:
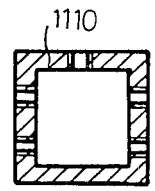
Figures 4, 5, 6, 7:
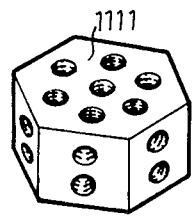
Figures 4, 5, 6, 7, 8:
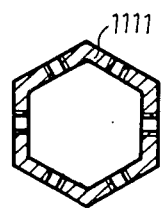
Figure 5:
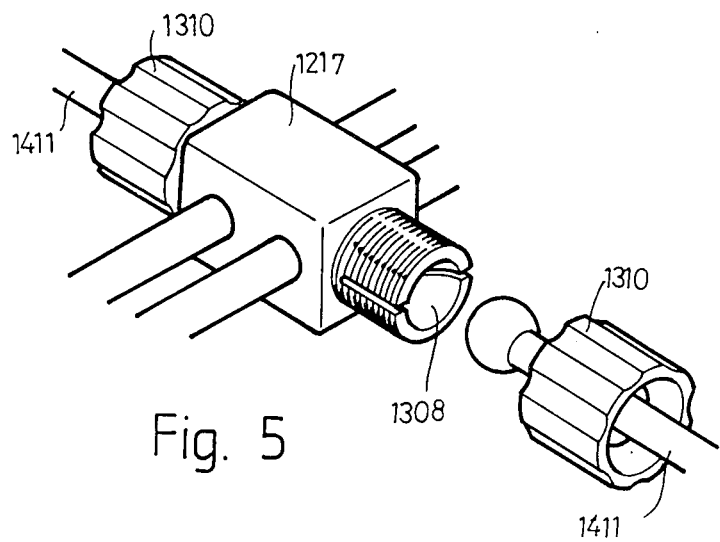
Figures 1, 5:
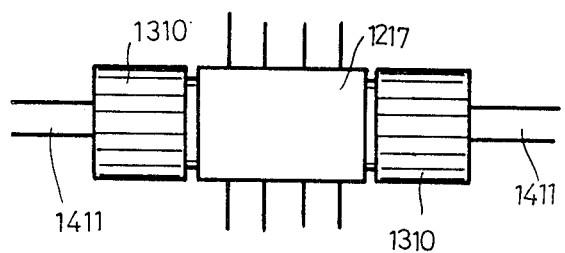
Figures 2, 5:
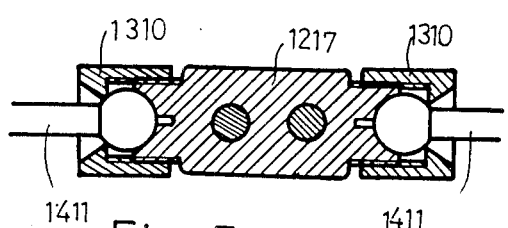
Figures 3, 5:
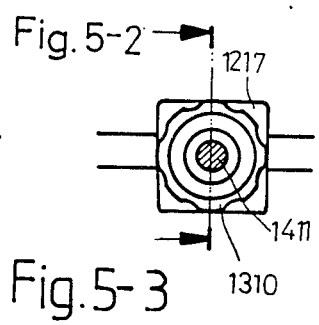
Figures 2, 7:
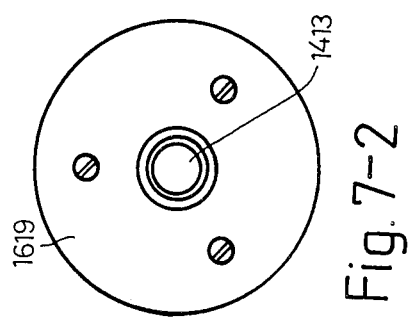
Figures 1, 7:
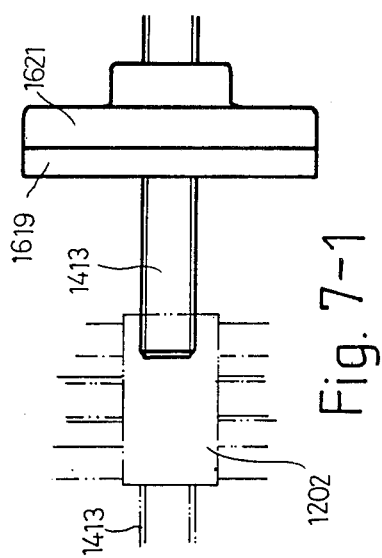
Figure 7:
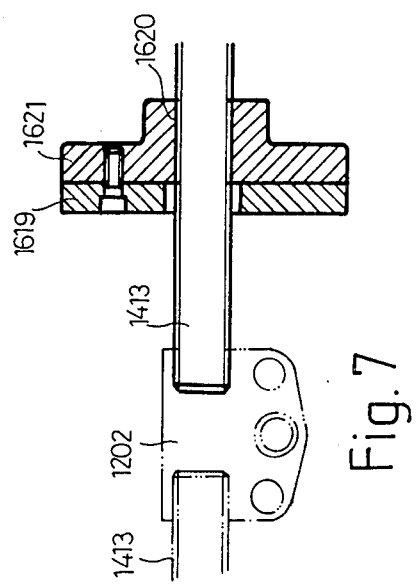
Figure 8:
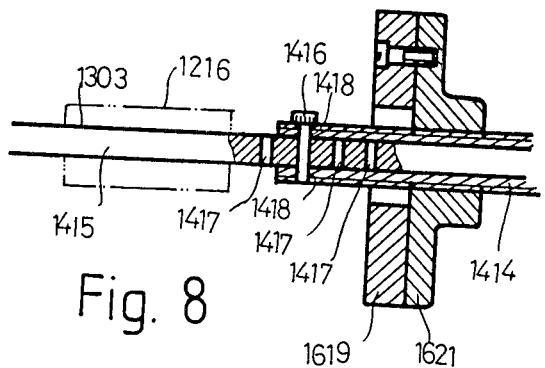
Figures 1, 8:
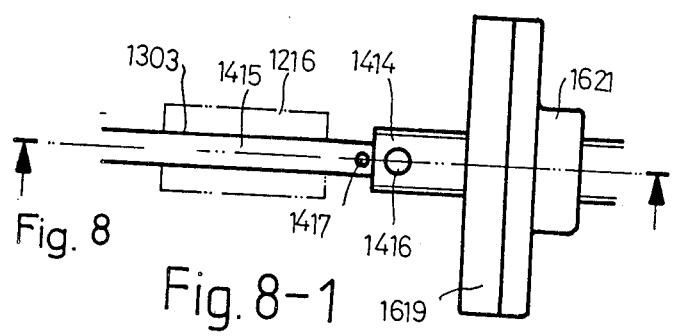
Figures 2, 8:
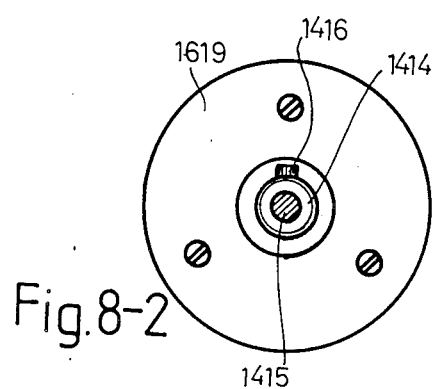
Figure 9:
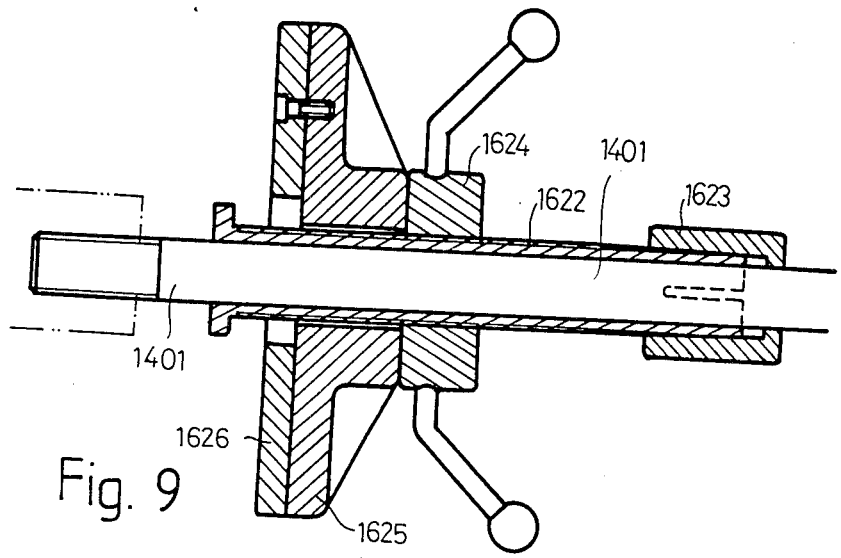
Figures 1, 9:
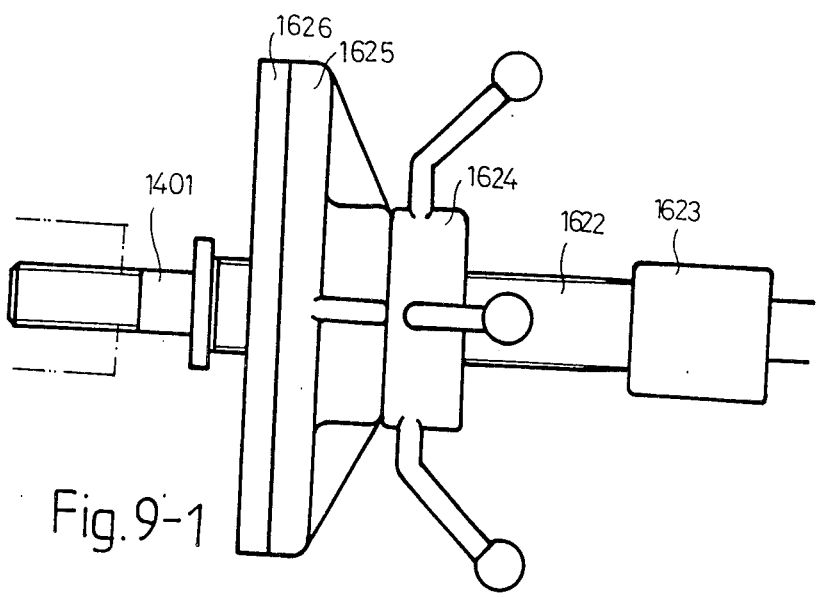
Figures 2, 9:
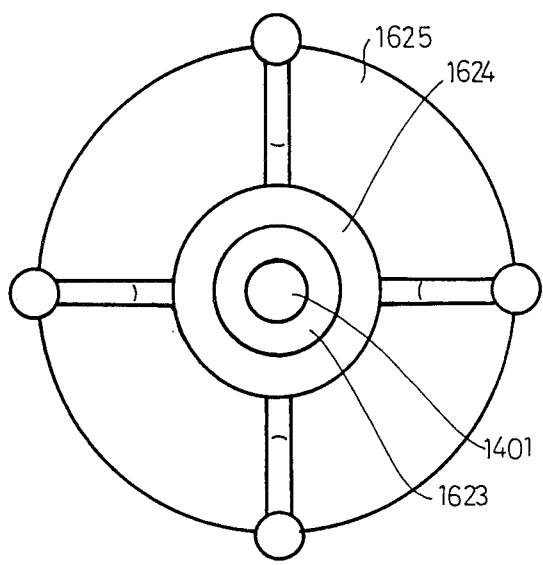
Figure 12:
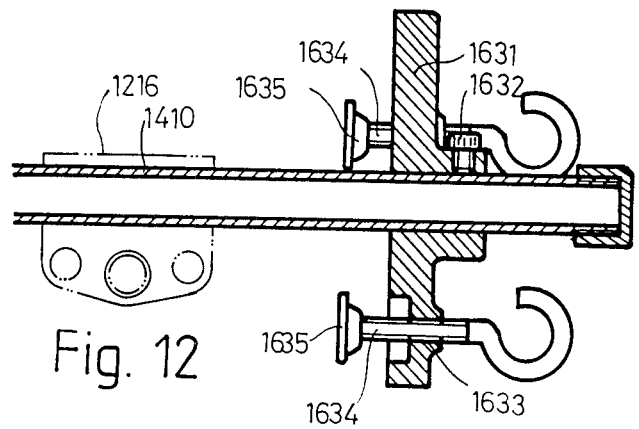
Figures 1, 12:
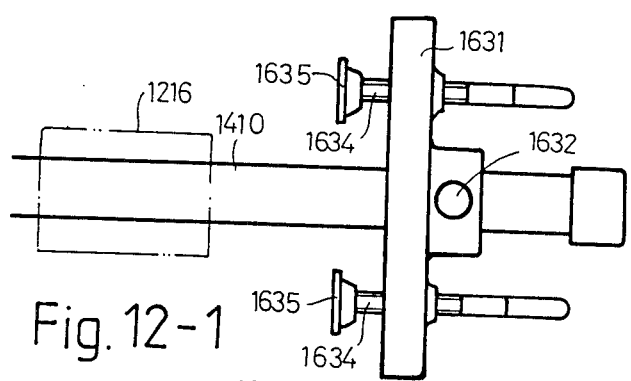
Figures 2, 12:
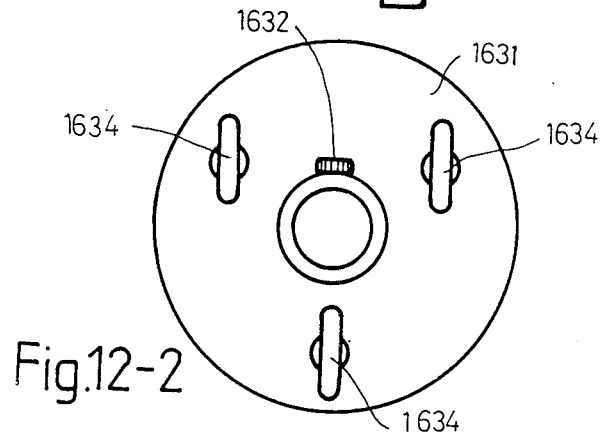
Figure 13:
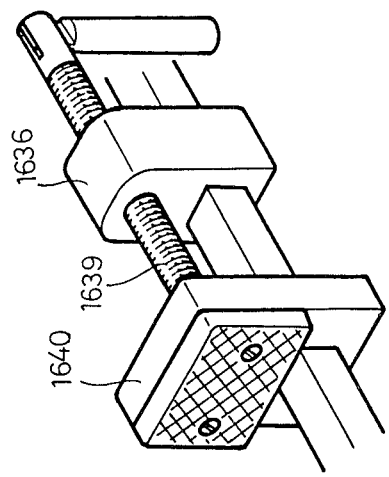
Figure 14:
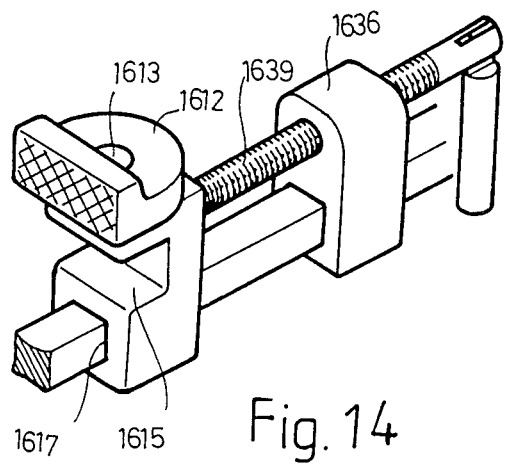
Figures 1, 14:
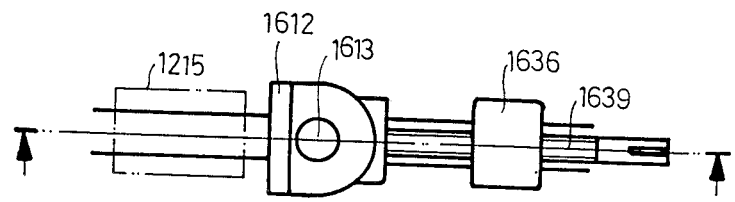
Figures 2, 14:
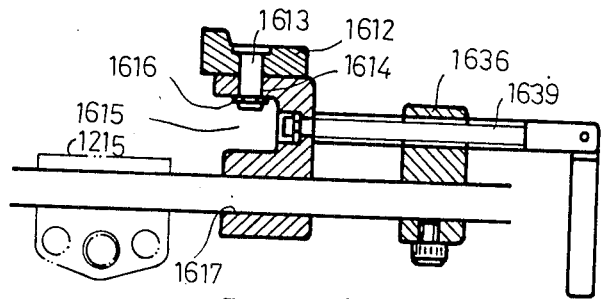
Figure 18:
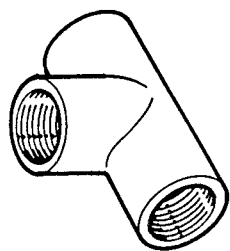
Figure 17:
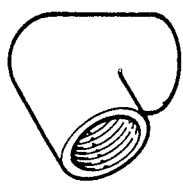
Figure 19:
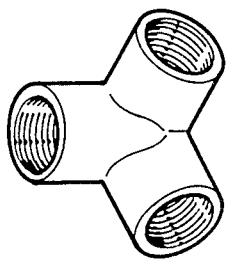
Figure 16:
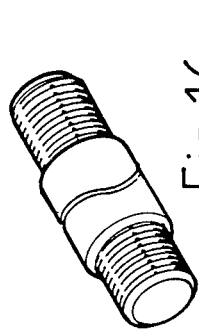
Figure 15:
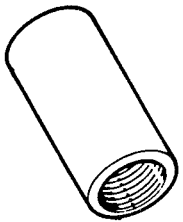
Figure 20:
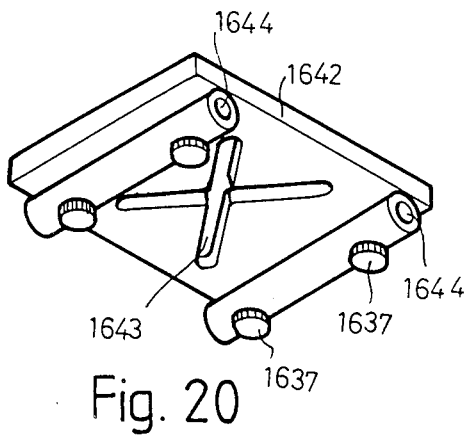
Figures 1, 20:
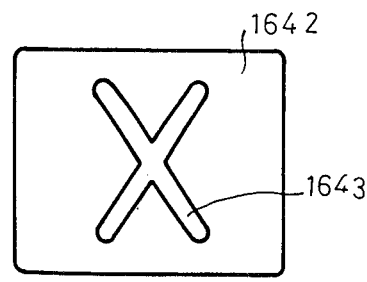
Figures 2, 20:
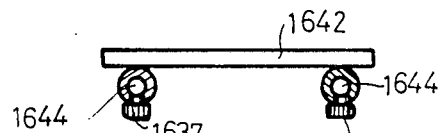
Figure 21:
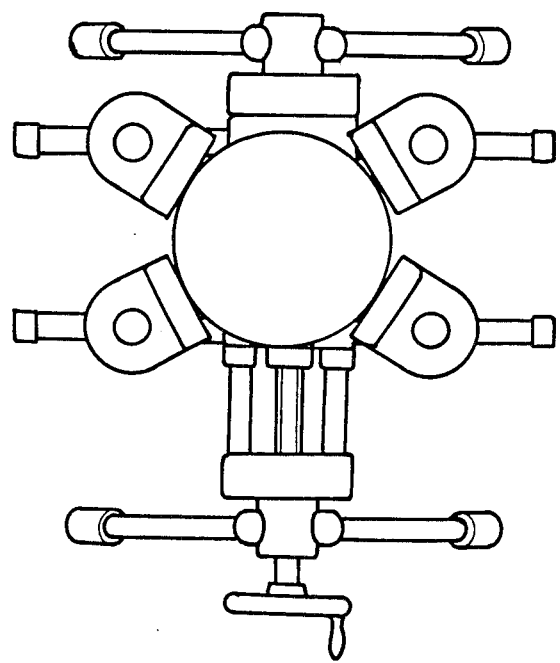
Figure 22:
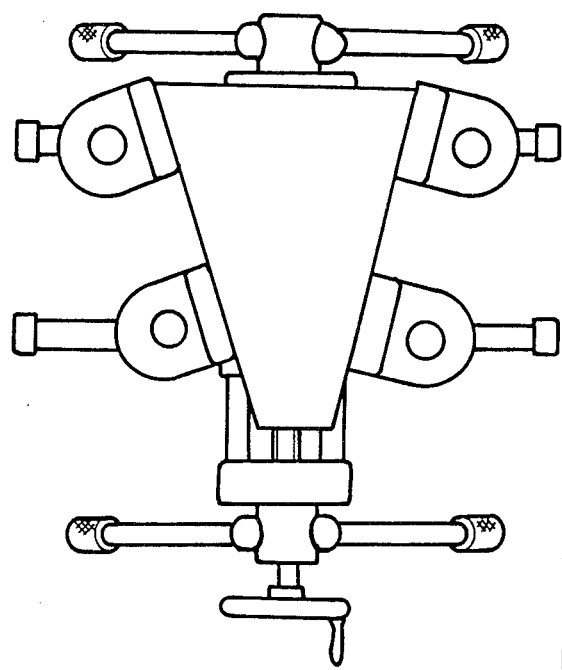
Figure 24:
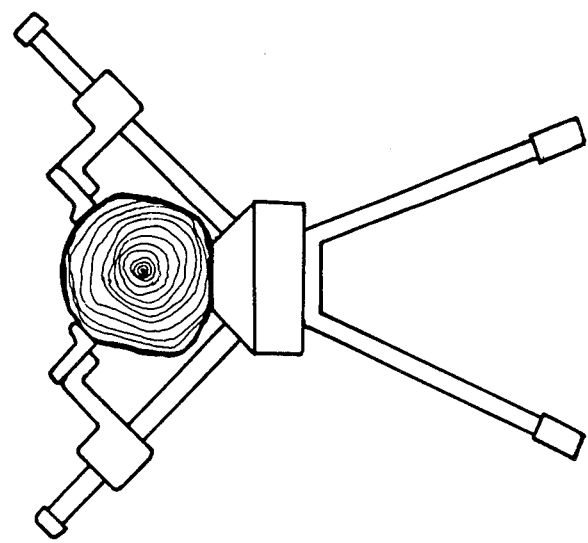
Figure 23:
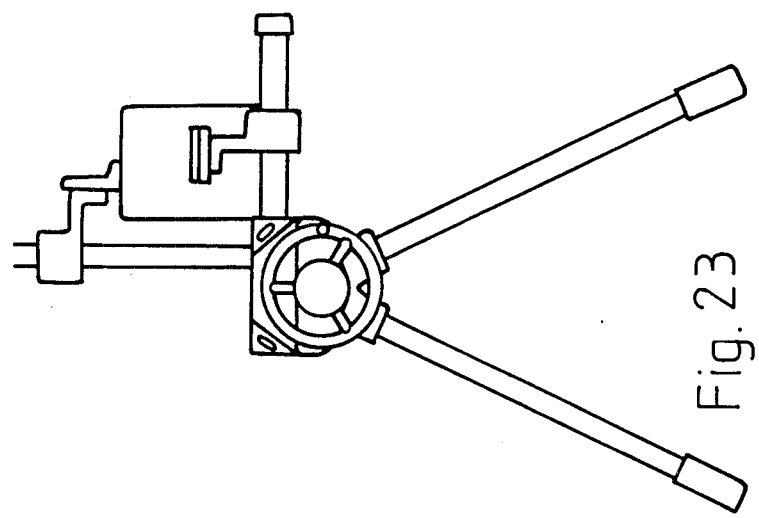
Figure 25:
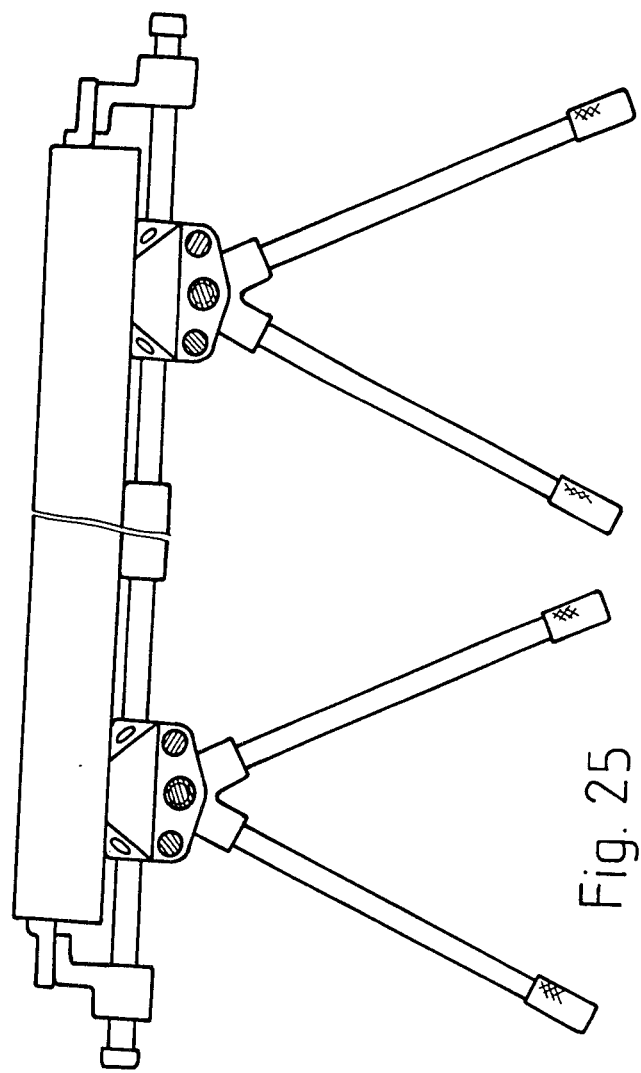
Figure 26:
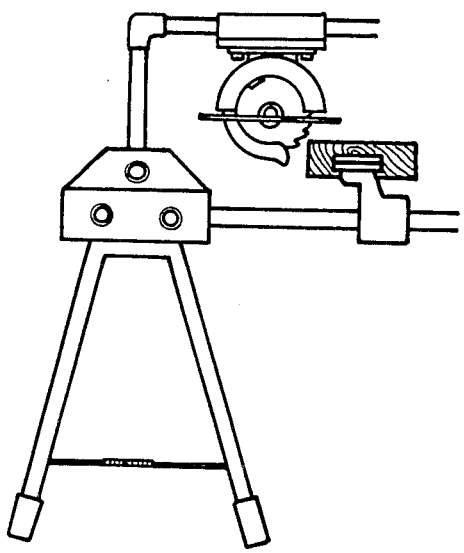
Figure 27:
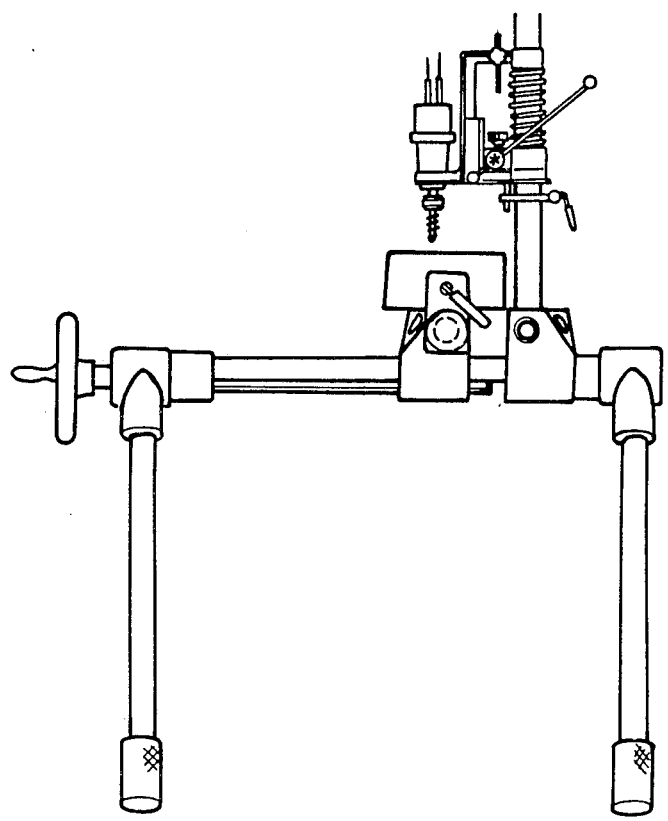
Figure 28:
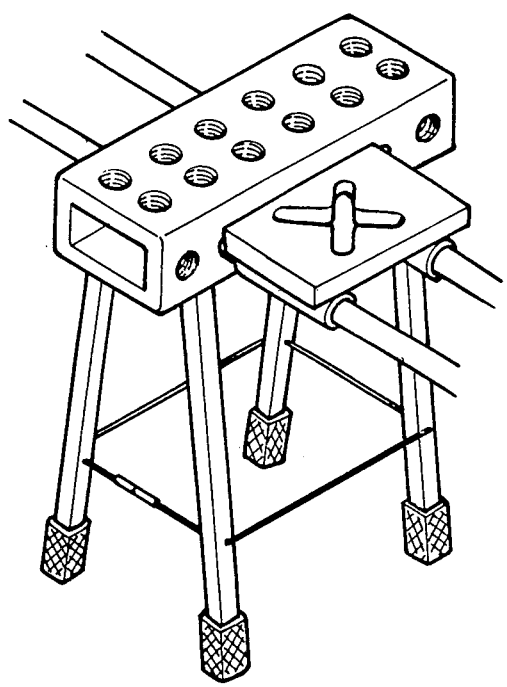

Besides, in this design, each of the ends of various support arms can be further provided with a multi-direction joint, and a connection pipe, or with auxiliary components such as the movable base seat parallel to the coupling holes, the threads combine of which the support arms with threads or the lateral-directional screws lock said component on the support arms, the examplary embodiments of said components and their applications are as follows:

FIG. 15 shows a parallel joint, in its application, the auxiliary support arm as shown in FIG. 16 is used to extend the support arm or to laterally connect another similar work bench, hereby enlarging the clamp capacity.

FIG. 17 shows an elbow joint, which in application, makes another section of the auxiliary support arm that said elbow joint is connected effect the bent in the required direction, hereby althering the clamp direction of the clamp structure.

FIGS. 18, 19 show a three-way joint which can further enlarge the support arm in a split way to set up a plurality of sets of clamp structure to clamp the work pieces, the number of the split heads and angles of the afore-said multi-way split joints can be selected according to the users needs.

FIGS. 20, 20-2 show the examplary embodiment of the structure of the base seat with parallel coupling holes, this structure is formed by the bench structure 1642 with a locking slot 1643, at least two parallel holes 1644 are provided in the back side of said bench 1642 to be coupled to the support arm that is parallel to said holes 1644 and is screwed and fixed in the jaw, a locking screw 1637 is set on the back of each of said parallel holes 1644 for loosening, sliding and positioning locking; the above-said bench 1642 can be installed with the tail seat with push pin, round saw, chain saw, driller, etc. for processing the clamped work pieces, or further said bench 1642 combiners the above-said processing apparatus as an integral structure.

Summing all the above up, the design of the present invention will have very wide applicable functions, especially FIGS. 21-28 show various exemplary embodiments, so its practicability is guite precise and clear.
/

I claim:

1. In a workbench, the combination of a frame including guide rail means, leg means on the frame for elevating the guide rail means to a workbench height, a fixed jaw mounted on the guide rail means, a movable jaw carried on the guide rail means, means for moving the movable jaw on the guide rail means towards and away from the fixed jaw, respectively, each of the jaws having a plurality of faces including at least one chamfered face, each of the faces being provided with respective recesses therein, respective elongated support rods adapted to be removably mounted in selected recesses in the jaws and projecting therefrom, whereby the respective rods may be disposed parallel or transversely to each other, a clamping block means on at least one of the rods and slidably adjustable thereon, means for securing the clamping block means in its desired adjusted position on the rod, and the clamping block means including a pair of clamps, and screw-threaded means carried by one of the clamps for moving the clamps towards and away from one another in a direction parallel to the rod, whereby variously shaped workpieces may be clamped within the workbench, and whereby the workbench has increased flexibility and versatility.

2. The combination of claim 1, wherein the guide rail means comprises a pair of horizontally-disposed parallel guide rails, and wherein the means for moving the movable jaw on the guide rail means includes a threaded rod disposed between the parallel guide rods and having an end portion, and a crank handle carried by the end portion of the threaded rod.

3. A workbench, comprising a frame, two pairs of splayed legs carried by the frame, the frame including a pair of horizontally-disposed parallel guide rods, a threaded rod between the guide rods and having an end portion extending beyond the frame, handle means carried on the end portion of the threaded rod, a fixed jaw on the frame, a movable jaw slidably mounted on the guide rods and carried by the threaded rod, thereby facilitating the movement of the movable jaw towards and away from the fixed jaw, each of the jaws having a plurality of faces transversely disposed relative to each other, each of the faces having at least one recess formed therein, an elongated support rod having an end portion removably secured within a respective recess in the respective face of each jaw, such that the elongated rods extend outwardly of the respective jaws, and such that the elongated rods may be arranged in a variety of positions relative to each other, a clamping block means adapted to be carried by each elongated rod and slidably adjustable thereon, and means for securing the clamping block means in their desired adjusted positions on the respective elongated rods.

* * * * *